(12) United States Patent
Deng et al.

(10) Patent No.: US 8,959,194 B1
(45) Date of Patent: *Feb. 17, 2015

(54) MERGING NETWORK DEVICE CONFIGURATION SCHEMAS

(75) Inventors: Donghua Deng, Santa Clara, CA (US);
Kent A. Watsen, Leesburg, VA (US);
James E. Fehrle, Menlo Park, CA (US);
Jianguo Hu, Santa Clara, CA (US);
Xingang Huang, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/440,718

(22) Filed: Apr. 5, 2012

Related U.S. Application Data

(63) Continuation of application No. 12/510,062, filed on Jul. 27, 2009, now Pat. No. 8,156,213.

(51) Int. Cl.
*G06F 15/16* (2006.01)

(52) U.S. Cl.
USPC .......................................... 709/223; 709/224

(58) Field of Classification Search
CPC ........................ H04L 41/085; H04L 41/0863
USPC .................................................. 709/223, 224
See application file for complete search history.

(56) References Cited

U.S. PATENT DOCUMENTS

| 7,072,946 | B2 | 7/2006 | Shafer |
| 7,730,179 | B2 | 6/2010 | Tanner |
| 7,844,718 | B2 | 11/2010 | Polcha et al. |
| 7,853,676 | B1 | 12/2010 | Freskos et al. |
| 7,926,033 | B2 | 4/2011 | Gopal et al. |
| 8,051,416 | B2 | 11/2011 | Grund et al. |
| 8,161,227 | B1 | 4/2012 | Diggs et al. |
| 2002/0178380 | A1 | 11/2002 | Wolf et al. |
| 2004/0030891 | A1 | 2/2004 | Kurihara |
| 2004/0261116 | A1 | 12/2004 | Mckeown et al. |
| 2004/0264698 | A1 | 12/2004 | Oda |
| 2005/0182948 | A1 | 8/2005 | Ducharme |
| 2007/0047735 | A1 | 3/2007 | Celli et al. |
| 2007/0268516 | A1 | 11/2007 | Bugwadia et al. |
| 2008/0301666 | A1 | 12/2008 | Gordon et al. |
| 2009/0198797 | A1 | 8/2009 | Wang et al. |

(Continued)

OTHER PUBLICATIONS

Enns, "NETCONF Configuration Protocol," Network Working Group, http://www.ietf.org/rfc/rfc4741.txt, Dec. 2006, 89 pp.

(Continued)

*Primary Examiner* — Adnan Mirza
(74) *Attorney, Agent, or Firm* — Shumaker & Sieffert, P.A.

(57) ABSTRACT

Techniques are described for merging device schemas to manage different versions of network devices in the same device family. In one example, a computing device includes an interface to receive a first schema to be used for managing a first version of a device in a device family and a second, different schema to be used for managing a second version of the device, a computer-readable medium encoded with instructions for a schema merger module, and a processor to execute the schema merger module to merge the first schema and the second schema to produce a resulting merged schema to be used for managing both the first version of the device and the second version of the device, wherein the resulting merged schema expresses differences between the first schema and the second schema and includes a single instance of each common portion between the first schema and the second schema.

19 Claims, 14 Drawing Sheets

(56) References Cited

U.S. PATENT DOCUMENTS

2009/0254639 A1 10/2009 Manchester et al.
2010/0250939 A1 9/2010 Adams et al.

OTHER PUBLICATIONS

Kipp et al., "The Virtual Fabrics MIB," Network Working Group, http://www.ietf.org/rfc/rfc4747.txt, Dec. 2006, 19 pp.

Netconf, "Motivation and overview," http://netconf.alioth.debian.org, Oct. 17, 2008, 4 pp.

W3C, Extensible Markup Language (XML) 1.0 (Fifth Edition), W3C Recommendation, http://www.w3.org/TR/REC-xml/, Nov. 26, 2008, 63 pp.

W3C, XML Schema Part 0: Primer Second Edition, W3C Recommendation, editors David C. Fallside and Priscilla Walmsley, Oct. 28, 2004, 77 pp.

W3C, XML Schema Part 1: Structures Second Edition, W3C Recommendation, editors Henry S. Thompson et al., http://www.w3.org/TR/xmlschema-1/, Oct. 28, 2004, 202 pp.

W3C, XML Schema Part 2: Datatypes Second Edition, W3C Recommendation, editors Paul V. Biron and Ashok Malhotra, Oct. 28, 2004, 153 pp.

U.S. Appl. No. 12/502,846, filed Jul. 14, 2009, entitled "Mass Activation of Network Devices,"

U.S. Appl. No. 12/510,062, filed Jul. 27, 2009, entitled "Merging Network Device Configuration Schemas".

MERGING NETWORK DEVICE CONFIGURATION SCHEMAS

This application is a continuation of U.S. application Ser. No. 12/510,062, filed Jul. 27, 2009, the entire contents of which are incorporated by reference herein.

TECHNICAL FIELD

This disclosure relates to computer networks and, more particularly, network management systems.

BACKGROUND

Network management systems typically include a management device and one or more managed devices. The management device provides a mechanism by which an administrator manages the managed devices, i.e., periodically configures the devices and monitors their activity. Recently, management devices have been designed to process manufacturer-supplied schemas (e.g., extensible markup language (XML) schemas typically in the form of XML Schema Definition (XSD) documents) that specify proper interaction and configuration of the managed devices. In other words, a manufacturer of a network device may supply a schema that specifies proper mechanism for interacting with and configuring the features of the network device. Further information on XML documents and XSD documents can be found in Extensible Markup Language (XML) 1.0 (Fifth Edition), W3C Recommendation 26 Nov. 2008, and XML Schema Part 1: Structures Second Edition, W3C Recommendation 28 Oct. 2004, respectively, the entire contents of both being incorporated herein by reference.

In general, the XML schema provided by the device manufacturer specifies appropriate syntactical structure for XML configuration files that, when produced by the management system in compliance with the XML schema, will be received and understood by the corresponding managed device so as to configure the managed device. For example, a schema may be used to describe to the management system the elements and attributes that can properly be present within the XML configuration file for that configuration file to be considered valid for a given managed device in view of the specifications of the device, the functions provided by the device, the network requirements for configuration of the device such as an Internet protocol (IP) address and hostname for the device, and mechanisms by which the management device interacts with the managed device. When a new version of a device is developed, a new schema may also be developed and released by the manufacturer, where the new schema completely specifies the permissible XML elements and parameters for all the features of the new version of the device.

Schemas for different versions of a device in the same device family will typically be substantially the same, but have some slight differences, to reflect differences between the different versions of the devices in the same family. Moreover, in order to simultaneously support different versions (that is, releases) of devices in the same device family, a management device must load multiple different schemas, one for each different version of the device that is to be managed.

As the number of versions of a device increases, loading multiple schemas will have a major impact on computer resources and system performance. Simply combining all of the schema versions into one master schema per device family (e.g., using an XML "import" or "include" statement) will result in an inefficient data structure that is not optimized, and can also result in errors such as scope errors for similarly declared elements and type errors similarly for defined element types.

Instead, in many cases, network management systems store each schema for each support version of a given managed device separately. Conventional network management systems typically either dynamically load a corresponding version according to a specific device, or initially loads all the releases of the schemas. Both of these conventional techniques are inefficient, time consuming and consume significant computing resources. Version-specific schemas are often larger than ten megabytes.

SUMMARY

In general, this disclosure describes techniques for merging schemas for two different versions of devices of the same device family to take advantage of similarities in the schemas to efficiently manage the devices and store the schemas for the devices, while enabling a network management system to load the merged schema to manage the different versions of the devices simultaneously, using a single merged schema. The techniques involve identifying differences between a new schema and a previous schema for two versions of devices in a device family and producing a merged schema from the new schema and the previous schema. In some examples, the previous schema is itself a merged schema, and is therefore also referred to by this disclosure as a previous merged schema.

For example, a device developer may produce the new schema when a new version of a device is developed. The device developer inputs the new schema into a merge software utility, for example, to merge the new schema with a previous merged schema for the previous version of the device. The merge utility compares the new schema to the previous merged schema, identifies differences such as deletions, additions, and modifications, and produces a new merged schema. The device developer may publish the new merged schema to an accessible repository, such as to a web server, where the new merged schema can be retrieved by a network management system that is managing the devices. A network management system that is managing different versions of the same device family retrieves the new merged schema from the web server when the network management system begins managing a newly deployed version of the device.

In one example, a method includes receiving, with a computing device, a first schema to be used for managing a first version of a device in a device family, receiving, with the computing device, a second, different schema to be used for managing at least a second, different version of the device in the device family, and merging, with the computing device, the first schema and the second schema to produce a resulting merged schema to be used for managing both the first version of the device and the second version of the device, wherein the resulting merged schema expresses differences between the first schema and the second schema and includes a single instance of each common portion between the first schema and the second schema.

In another example, a network device includes a first interface to receive a first schema to be used for managing a first version of a device in a device family, a second interface to receive a second, different schema to be used for managing at least a second, different version of the device in the device family, a computer-readable storage medium encoded with instructions for a schema merger module, and a processor to execute the schema merger module to merge the first schema and the second schema to produce a resulting merged schema to be used for managing both the first version of the device and the second version of the device, wherein the resulting merged schema expresses differences between the first schema and the second schema and includes a single instance of each common portion between the first schema and the second schema. In one example, the first and second interfaces are the same interface.

In another example, a computer-readable storage medium is encoded with instructions for causing a programmable processor to receive a first schema to be used for managing a first version of a device in a device family, receive a second, different schema to be used for managing at least a second, different version of the device in the device family, and merge the first schema and the second schema to produce a resulting merged schema to be used for managing both the first version of the device and the second version of the device, wherein the resulting merged schema expresses differences between the first schema and the second schema and includes a single instance of each common portion between the first schema and the second schema.

In another example, a system includes a network-accessible repository comprising a first schema to be used for controlling generation of configuration data for a first version of a device in a device family, a computing device comprising a first interface to retrieve the first schema from the network-accessible repository, a second interface to receive a second, different schema to be used for controlling generation of configuration data for a second, different version of the device in the device family, a computer-readable storage medium encoded with instructions for a schema merger module, and a processor to execute the schema merger module to automatically identify differences between the first schema and the second schema and to automatically merge the first schema and the second schema to produce a resulting merged schema to be used for controlling generation of configuration data for both the first version of the device and the second version of the device according to the identified differences between the first schema and the second schema, wherein the resulting merged schema expresses the identified differences between the first schema and the second schema and includes a single instance of each common portion between the first schema and the second schema, wherein the computing device is configured to publish the resulting merged schema to the network-accessible repository, a first managed device comprising an instance of the first version of the device in the device family, a second managed device comprising an instance of the second version of the device in the device family, and a network management device communicatively coupled to the first managed device and the second managed device, wherein the network management device is configured to retrieve the published resulting merged schema from the network-accessible repository, to generate configuration data according to the resulting merged schema, and to manage the first managed device and the second managed device according to the generated configuration data.

The techniques of this disclosure may provide one or more advantages. For example, the techniques of this disclosure can be used to generate a single merged schema from multiple versions of device configuration schemas corresponding to different versions of devices from a common device family. As a result, only one schema need be loaded into a network management system to fully support each of the different versions of the device. The merged schema is also optimized to benefit the performance of the network management system.

The details of one or more examples are set forth in the accompanying drawings and the description below. Other features, objects, and advantages will be apparent from the description and drawings, and from the claims.

DETAILED DESCRIPTION

Figure 1:
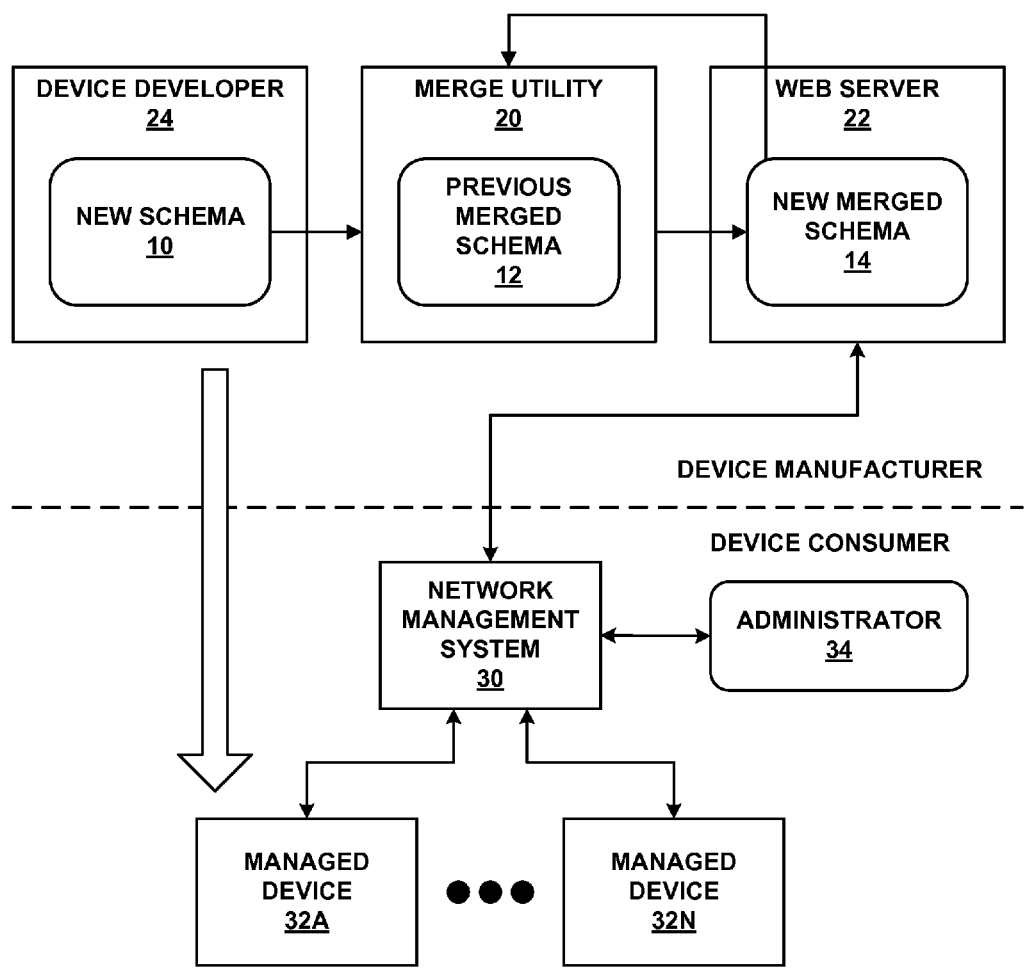
FIG. 1 is a block diagram illustrating an example system in which a merge utility merges a new schema with a previous merged schema to produce a new merged schema.

FIG. 1 is a block diagram illustrating an example system 2 in which a merge utility 20 merges a new schema 10 with a previous merged schema 12 to produce a new merged schema 14. In the example of FIG. 1, device developer 24 periodically develops new versions of network devices that are deployed to customers as managed devices, such as managed devices 32A-32N (managed devices 32). It is assumed that each of managed devices 32 belong to the same device family. For example, each of managed devices 32 may belong to a device family of routers, switches, gateways, bridges, hubs, servers, computing devices, computing terminals, printers, or other managed network devices. In general, references to a family of devices refer to devices of the same type with the same purpose that include slight variations, such as variations in hardware, software, and/or firmware. The variations may include variations in available hardware units and/or operating systems (such as versions of the same operating system). The variations may also include variations in software, such as implemented protocols.

Certain ones of managed devices 32 comprise different versions of devices in the same device family. For example, managed device 32A may comprise a first version of a router, while managed device 32B may comprise a second, different version of the router. Accordingly, managed device 32A may be associated with a first schema and managed device 32B may be associated with a second, different schema. In accordance with the techniques of this disclosure, network management system 30 manages each of managed devices 32 using a merged schema 14 retrieved from web server 22. In some examples, network management system 30 comprises a computing device for managing each of managed devices 32. Such a computing device is also referred to as a network management device. In general, schemas drive how managed devices 32 interact with network management system 30, and how network management system 30 interacts with managed devices 32, such as the format and structure, elements and parameters of configuration files that the network management system may output for the managed devices. Schemas also drive how a user, e.g., administrator 34, interacts with managed devices 32.

In particular, schemas are used to control generation of configuration data for a corresponding version of a device.

Likewise, a merged schema is generally used to control generation of configuration data for a corresponding plurality of versions of a device in a corresponding device family. In some examples, a schema comprises an extensible markup language schema (XML) definition document (XSD), from which XML documents are generated to manage devices such as managed devices 32. Additional details regarding the use of XML documents to manage network devices can be found in U.S. Pat. No. 7,072,946, entitled "NETWORK ROUTER MANAGEMENT INTERFACE WITH API INVOKED VIA LOGIN STREAM," which issued Jul. 4, 2006 to Phillip Shafer, and is hereby incorporated by reference in its entirety.

Although managed devices 32 are depicted in FIG. 1 and described as belonging to the same family, it should be understood that generally, network management system 30 manages a plurality of different types (also referred to as families) of devices, and each type of device may include different versions of the corresponding type. For example, network management system 30 may manage a plurality of routers, switches, gateways, bridges, hubs, servers, computing devices, computing terminals, printers, or other managed network devices. Accordingly, for each different family of managed devices, network management system 30 includes a distinct merged schema.

Device developer 24 develops managed devices 32 that are shipped or otherwise deployed to a device consumer's network. Device developer 24 also periodically develops updated versions of managed devices 32. When device developer 24 develops an updated version of managed devices 32 (e.g., the developer releases a new version of an existing type of router), device developer 24 also develops a new schema 10. New schema 10 generally includes information similar to the previous version of managed devices 32, with some slight variations. Empirical testing has shown that, on average, a new schema by some vendors for some families of devices includes approximately a 5% from a previous schema for a major new version, and approximately a 1% difference from a previous schema for a minor new version. New schema 10 reflects differences in the new version of the device, which may include, for example, differences in an operating system of the device, differences in the platform itself (such as a new, modified, or removed hardware unit), or other differences that arise in the development of a new version of a device.

Upon developing new schema 10, device developer 24 invokes merge utility 20 using new schema 10 as an input. Merge utility may, for example, be a software executable operating on one or more internal computing devices of device developer 20 that merges new schema 10 with a previous merged schema 12, which is typically retrieved from an internal repository of the device developer. Although generally described as a previous merged schema 12, it should be understood that a schema corresponding to an initial version of a device is not "merged" with any earlier schema, because no earlier version of the schema exists. However, it is expected that multiple versions of a device will be developed, each having a corresponding new schema, therefore this disclosure refers to previous merged schema 12 for ease of illustration.

Previous merged schema 12 represents the most current merged schema for earlier versions of the device for which a new device version and new schema 10 were developed. Device developer 24 invokes merge utility 20 with new schema 10 and previous merged schema 12 as input to produce a new merged schema 14. In accordance with the techniques of this disclosure, merge utility 20 compares new schema 10 with previous merged schema 12 to automatically identify differences between new schema 10 and previous merged schema 12 and produces new merged schema 14. That is, merge utility 20 auto-generates a superset of multiple XML schemas, which explicitly and coherently specifies all variations between the schema information for different releases, platforms, and options of the different versions of managed devices 32.

In one example embodiment, merge utility 20 publishes new merged schema 14 to a network-accessible repository, such as web server 22, so that network management systems, such as network management system 30, are able to easily retrieve the most recent versions of merged schemas, such as new merged schema 14. Web server 22 is an example of a network-accessible repository from which network management system 30 may retrieve schemas to be used for controlling generation of configuration data for managed devices 32. When a device consumer or the consumer's representative, such as administrator 34, purchases a new version of a managed device, administrator 34 uses network management system 30 to retrieve new merged schema 14 from web server 22.

Network management system 30 is communicatively coupled to network devices of the consumer network, including managed devices 32 and other network devices, e.g., devices of other device families, which may include different versions of the devices in each device family. Once managed devices 32 are deployed, network management system 30 manages managed devices 32 using a communications protocol, such as Netconf, as described by http://netconf.alioth.debian.org, and by RFC 4741, "NETCONF Configuration Protocol," by R Enns, Network Working Group, December 2006, available at http://www.ietf.org/rfc/rfc4741.txt, each of which is incorporated herein by reference in its entirety, or a management interface derived from Netconf, such as the Juniper Device Management Interface. In common practice, network management system 30 and devices managed by network management system 30 are centrally maintained by an IT group of an enterprise. Administrator 34 interacts with network management system 30 to remotely monitor and configure managed devices 32. For example, administrator 34 may receive alerts from network management system 30 regarding the managed devices, view configurations or management data of the managed devices, modify the configurations or management data of the managed devices, add new managed devices to the network (which may include different versions of devices in a device family), remove existing managed devices from the network, or otherwise manipulate the network and managed devices.

Network management system 30 uses a merged schema, such as previous merged schema 12 or new merged schema 14, to correctly present options to system administrators and properly construct configuration data for managed devices 32 of various versions. Assuming that the previous highest version number for managed devices 32 is X, and that the newest version number is Y (corresponding to new schema 10), network management system 30 can use previous merged schema 12 to manage any of managed devices 32 with version numbers less than or equal to X, but must retrieve new merged schema 14 to manage managed devices 32 with versions equal to Y. Likewise, network management system 30 is also able to manage managed devices 32 with versions less than Y using new merged schema 14, because new merged schema 14 incorporates both new schema 10 and previous merged schema 12.

Merge utility 20 also updates (e.g., replaces) previous merged schema 12 with new merged schema 14. In the example of FIG. 1, merge utility 20 retrieves "new" merged schema 14 as part of a development cycle feedback loop such that when a subsequent version of the schema is received from device developer 24, the subsequent version of the schema will be merged with the most up-to-date version of the merged schema, namely new merged schema 14. In this manner, merge utility 20 replaces previous merged schema 12 with new merged schema 14, in anticipation of another new schema 10.

As discussed in greater detail below, merge utility 20 generally identifies differences between new schema 10 and previous merged schema 12 and produces new merged schema 14 that reflects these differences without repetitiously including redundant data. That is, for an element of new schema 10 that is identical to a corresponding element of previous merged schema 12, merge utility 20 stores a single copy of the element in new merged schema 14. However, for an element of new schema 10 that is different from previous merged schema 12, merge utility 20 includes an indication that a difference exists, as well as how to manage each version of the device with respect to this element of the schema.

Differences between new schema 10 and previous merged schema 12 include an added element to new schema 10, a deleted element from new schema 10, and modifications to an element of new schema 10. In one example, schemas comprise extensible markup language (XML) schema (XSD) documents. Accordingly, for this example, an addition to new schema 10 is a new XML element defined with new schema 10, a deletion is an XML element that is present in previous merged schema 12 but not present in new schema 10, and a modification is a difference between corresponding XML element definitions within new schema 10 when compared to previous merged schema 12.

In some examples, differences between new schema 10 and previous merged schema 12 include differences between whether an element is global or local, or a type mismatch between elements declared in the two schemas. As an example, previous merged schema 12 may include a local element named "element," and new merged schema 10 may include a global element also named "element." As another example, previous merged schema 12 may include an element named "element" that is declared as a "simpleType," while new schema 10 may include an element also named "element" that is declared as a "complexType." Merge utility 20 detects these differences as well and produces new merged schema 14 to reflect these differences, as described in greater detail below.

As an example overview of the techniques of this disclosure, assume that previous merged schema 12 provides schemas for managing routers of version 8.1 and below. Device developer 24 then develops version 8.2 of a router. New schema 10 then comprises a schema for managing version 8.2 routers. Merge utility 20 would then merge new schema 10 with previous merged schema 12 to produce new merged schema 14. When administrator 34 purchases a router of version 8.2, administrator 34 interacts with network management system 30 to retrieve new merged schema 14 from web server 22. Administrator 34 also connects the new version 8.2 router to the network. Network management system 30 would then be able to manage all routers in the consumer's network, including the version 8.2 router, using new merged schema 14. Moreover, merge utility 20 would treat new merged schema 14 as the "previous" merged schema 12, such that when device developer 24 develops version 8.3 of the router, merge utility 20 can merge the schema for version 8.3 of the router with the merged schema for versions 8.2 and below of the router.

Figure 2:
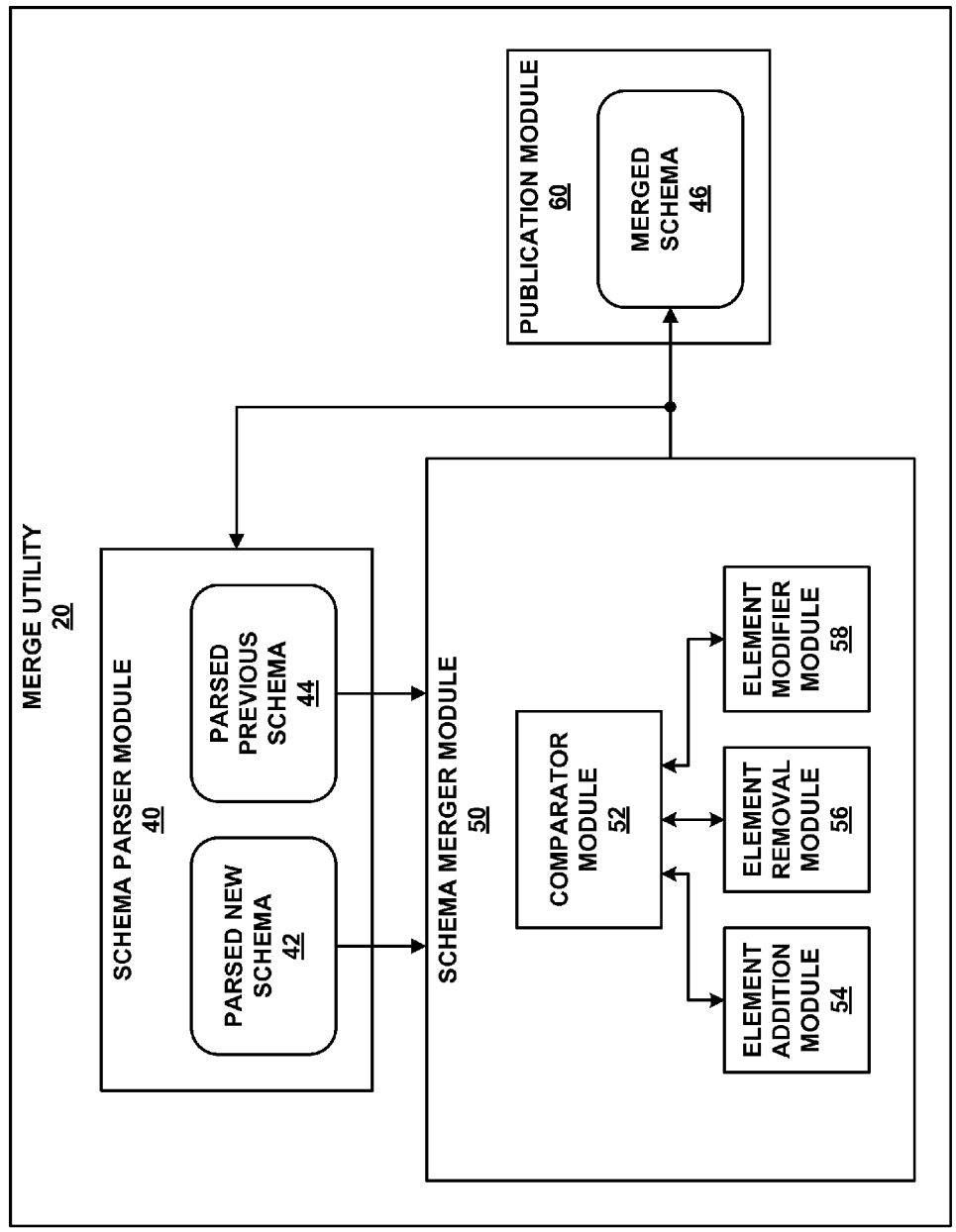
FIG. 2 is a block diagram illustrating an example configuration of modules of a merge utility.

FIG. 2 is a block diagram illustrating an example configuration of software modules of merge utility 20. In the example of FIG. 2, merge utility 20 comprises schema parser module 40, schema merger module 50, and publication module 60.

Schema parser module 40 receives new schema 10 (FIG. 1) and previous merged schema 12 (FIG. 1) as input. In one example, schema parser module 40 retrieves previous merged schema 12 from an internal data repository of the device developer, whereas in another example, schema parser module 40 stores a local copy of previous merged schema 12 in a computer-readable storage medium (not shown). In one example, a computing device comprises an interface that receives new schema 10 and previous merged schema 12, a computer-readable storage medium encoded with program instructions for schema parser module 40, schema merger module 50, and publication module 60, a processor that executes the schema parser module 40, schema merger module 50, and publication module 60 to perform the techniques of this disclosure. In various examples, the interface comprises a graphical user interface (GUI), a command line interface, a network interface such as a network interface card, a system interface, a database interface, and a file system interface. In some examples, the computing device includes two different interfaces, a first interface to receive new schema 10 and a second interface to receive previous merged schema 12.

In general, merge utility 20 auto-generates a superset of multiple XML schemas, corresponding to the merger of new schema 10 with previous merged schema 12. The superset contains all the schema information for different releases, platforms, and the like. The merged schema also explicitly specifies all the variations among those schemas. In one example, the merged schema explicitly specifies the variations using XML "appinfo" elements of different-level annotations. Accordingly, only one schema needs to be loaded into network management system 30 (FIG. 1) in order to support all the releases of managed devices 32, and corresponding schema information can be retrieved correctly based on the specific device version. In one example, the expression of variations of schemas conforms to the Device Management Interface (DMI) specification of Juniper Networks, extended with version-related tags. In one example, the expression of the schema variations across releases is realized by a "matching expression" as introduced by the DMI specification, which is an extension to the NETCONF network management protocol. The NETCONF protocol provides mechanisms to install, manipulate, and delete the configuration of network devices using XML-based data encoding for the configuration data as well as the protocol messages. Further details on the NETCONF protocol can be found in "NETCONF Configuration Protocol," RFC 4747, Internet Engineering Task Force (IETF), December 2006, the entire content of which is incorporated herein by reference.

Schema parser module 40 parses new schema 10 to produce parsed new schema 42. In general, parsing involves syntactic and semantic analysis of new schema 10. In one example, schema parser module 40 utilizes a tokenizer to identify "tokens" of new schema 10, e.g., white space, symbols, numbers, and words, and a parser to determine meaning of each token. In one example, schema parser module 40 utilizes a context-free grammar to parse new schema 10 to produce parsed new schema 42. Likewise, in some examples, schema parser module 40 applies the tokenizer, parser, and context-free grammar to previous merged schema 12 to produce parsed previous schema 44. Parsed new schema 42 and parsed previous schema 44 each also indicate versions of a device to which they are applicable, e.g., in header information.

In one example, parsed new schema 42 and parsed previous schema 44 each comprise data structures that represent elements of new schema 10 and previous merged schema 12, respectively. A schema typically includes a root node tag "<schema>". Child nodes of <schema> may be types and/or elements. Types and elements are hierarchically structured. A symbol table may be used by merge utility 20, as described by this disclosure, to merge elements of parsed new schema 42 and parsed previous schema 44, but is not generally used for describing the schema outside of merge utility 20. In one example, parsed new schema 42 and parsed previous schema 44 each comprise tree data structures that comprise hierarchically arranged acyclic nodes for which each node has at most one parent node and zero or more child nodes. In another example, new schema 10 and parsed previous schema 44 each correspond to symbol tables. For purposes of explanation, this disclosure is directed to the example in which parsed new schema 42 and parsed previous schema 44 are represented by tree data structures, however, it should be understood that other methods exist for representing parsed schemas, and that the techniques of this disclosure are also applicable to these other methods for representing parsed schemas.

Schema parser module 40 passes parsed new schema 42 and parsed previous schema 44 to schema merger module to be merged into a merged schema, such as merged schema 46. In the example of FIG. 2, schema merger module 50 comprises comparator module 52, element addition module 54, element removal module 56, and element modifier module 58. Comparator module compares parsed new schema 42 and parsed previous schema 44 to identify differences between parsed new schema 42 and parsed previous schema 44. For portions of parsed new schema 42 and parsed previous schema 44 that are the same, schema merger module 50 uses one instance of the portion in merged schema 46. However, comparator module 52 determines that additions to parsed new schema 42, deletions from parsed new schema 42, and modified elements of parsed new schema 42 (with respect to parsed previous schema 44) comprise differences, and uses element addition module 54, element removal module 56, and element modifier module 58 to handle these differences, respectively.

Differences between new schema 10 and previous merged schema 12 can generally be classified into four types: detectable and expressible differences, detectable but not expressible differences, detectable differences that are regarded as errors, and differences that are not detectable. Detectable and expressible variations include new or deleted global type definition, new or deleted global element declaration, new or deleted local element declaration, modified element declaration, such as modified "minOccurs" property of an element, modified "maxOccurs" property of an element, or Modified the "default value" of an element, modified single-value facets of simple type definition, including FACET_MINLENGTH, FACET_MAXLENGTH, FACET_MAXINCLUSIVE, and FACET_MININCLUSIVE, new or deleted enumerations for a simple type definition, different annotations for a schema, and different annotations for element declarations.

For detectable but not expressible differences, comparator module 52 is configured to raise a warning or error message, but not to express the differences in new merged schema 14. Detectable but not expressible differences include different local and globe element declarations for the following properties: abstract, nillable, constraint type (Default/Fixed), fixed value, new or deleted identity constraints, modified identity constraints such as different reference key, different selector string, and new/deleted constraint string, substitution group affiliation, substitution group exclusions, disallowed substitutions, different local or globe simple type definition for the following features including: base type name (namebased comparison for base type), primitive type, member types for "union" variety, item type for "List" variety, "Fixed" of facets, single-value Facet (FACET_WHITESPACE, FACET_LENGTH, FACET_TOTALDIGITS, FACET_FRACTIONDIGITS, FACET_MAXEXCLUSIVE, FACET_ MINEXCLUSIVE), new or deleted multi-value Facet (FACET_PATTERN), fundamental facet (Ordered, Bounded, Finite, Numeric, Final), different local or globe complex type definitions for the following properties: final, base type name, minOccurs and maxOccurs of particle, abstract, derivation Method, prohibited substitutions, simpleType (No attribute comparison), new or deleted global attributes declarations, new or deleted local attributes declarations, and modified global or local attribute declarations.

Comparator module 52 is also configured to raise an error or warning for detectable errors (that is, differences that are classified as errors). Detectable errors include different type categories of elements where one is of simpleType, while the other is of complexType, different content types of complexTypes (allowed content types are empty, simple type definition, mixed and element-only), different particle types of complexTypes (allowed particle types include element declaration, model group and wildcard), and different varieties of simpleTypes (allowed varieties are union, list, and atomic, and different flattened XPaths for element declarations).

Comparator module 52 is configured to ignore undetectable differences, which include, for example, different orders or dependencies among child elements of each particle, different definitions or declarations for global components including Attribute Declaration, Model Group Definition, Attribute Group, and Notation Declaration, different features of element declaration, such as EnclosingCTDefinition and the annotations of Identity Constraint, different annotations of simple and complex type definitions, different declarations for attributes of a complexType definition, and different definitions for wildcard particles.

In general, comparator module 52 traverses parsed new schema 42 and determines whether, for each element of parsed new schema 42, a corresponding element exists for parsed previous schema 44. When comparator module 52 identifies an identical element in parsed previous schema 44 for an element of parsed new schema 42, comparator module 52 determines that the elements are the same for both new schema 10 and previous merged schema 12, so comparator module 52 includes a common version of the element in merged schema 46. When comparator module 52 identifies an element in parsed previous schema 44 with the same name but with a different value, comparator module 52 determines that the elements are different between new schema 10 and previous merged schema 12. When comparator module 52 does not identify a corresponding element in parsed previous schema 44, comparator module 52 determines that the element of parsed new schema 42 is a new element. Comparator module 52 also traverses parsed previous schema 44 to identify elements in parsed previous schema 44 that are not present in parsed new schema 42, which comparator module 52 determines are elements that have been removed from new schema 10.

When comparator module 52 determines that parsed new schema 42 includes an element that is not present in parsed previous schema 44, comparator module 52 calls element addition module 54 to indicate an added element in merged schema 46. Element addition module 54 then adds the new element to merged schema 46. Element addition module 54 also flags the new element in merged schema 46 to indicate for which versions of the device the new element is applicable.

In one example, within the new element, element addition module 54 adds a sub-element <available> that indicates for which versions of the device the new element is available. Within the <available> element, element addition module 54 adds an indicator that an added is available for particular version of the device. In one example, the indicator comprises a sub-element for each version of the device represented by merged schema 46 and indicates, for each version sub-element, whether the new element is available for that version. In one example, as shown in the XSD example below, the indicator comprises a <matches> element, with sub-elements <match>. Each <match> element includes a <release> sub-element that indicates for what version the super-element is available.

For example, assume that for version 8.2 of a device, a new element is introduced named "interface-id." For each of versions 8.1 and below of the device, there is no element named "interface-id." Comparator module 52 identifies an element named "interface-id" in parsed new schema 42 and determines that no "interface-id" element is present in parsed previous schema 44. Therefore, comparator module 52 calls element addition module 54 to add "interface-id" to merged schema 46, and to indicate that "interface-id" is available only for version 8.2 of the device. The following is an example portion of an XSD document that element addition module 54 generates when a new element has been introduced, for which each <match> element includes a sub-element <release> that indicates a corresponding version of the device and a <value> sub-element, the combination of which indicates each version for which element "interface-id" is available:

```
<xsd:element name="interface-id" type="xsd:unsignedInt">
  <xsd:annotation>
    <xsd:appinfo>
      <dmi:element-info>
        <title>Interface ID</title>
        <available>
          <matches>
            <match>
              <release>8.2</release>
              <value>true</value>
            </match>
            <match>
              <release>8.1</release>
              <value>false</value>
            </match>
          </matches>
        </available>
      </dmi:element-info>
    </xsd:appinfo>
  </xsd:annotation>
</xsd:element>
```

The example portion of an XSD document includes an indication of the element name "interface-id." The example also includes element <available> that indicates, for release 8.2, element "interface-id" is available, in that the value of <match> for release 8.2 is "true," but that element "interface-id" is not available for release 8.1, in that the value of <match> for release 8.1 is "false." In some examples, element addition module 54 only adds release values to <match> for which true values would occur. In this manner, network management system 30 would determine that the element is available only for those releases for which the element is explicitly defined. The following provides an example of this alternative:

```
<xsd:element name="interface-id" type="xsd:unsignedInt">
  <xsd:annotation>
    <xsd:appinfo>
      <dmi:element-info>
        <title>Interface ID</title>
        <available>
          <matches>
            <match>
              <release>8.2</platform>
            </match>
          </matches>
        </available>
      </dmi:element-info>
    </xsd:appinfo>
  </xsd:annotation>
</xsd:element>
```

When comparator module 52 determines that parsed previous schema 44 includes an element that is not present in parsed new schema 42, comparator module 52 calls element removal module 56 to indicate a removed element in merged schema 46. Element removal module 56 removes an element for a device version relating to new schema 10, but ensures that the element is still available for earlier versions that utilize that element. In general, element removal module 56 renders the removed element unavailable for device versions corresponding to parsed new schema 42. Element removal module 56, in one example, flags the versions for which such an element is available. With respect to the example of "interface-id," assuming that element "interface-id" is present in earlier versions of a schema but not present in a new schema, element removal module 56 produces, in this example, the following portion of an XSD document for merged schema 46:

```
<xsd:element name="interface-id" type="xsd:unsignedInt">
  <xsd:annotation>
    <xsd:appinfo>
      <dmi:element-info>
        <title>Interface ID</title>
        <available>
          <matches>
            <match>
              <release>8.2</release>
              <value>false</value>
            </match>
            <match>
              <release>8.1</release>
              <value>true</value>
            </match>
          </matches>
        </available>
      </dmi:element-info>
    </xsd:appinfo>
  </xsd:annotation>
</xsd:element>
```

When comparator module 52 determines that parsed new schema 42 includes an element that is present but defined differently in parsed previous schema 44, comparator module 52 calls element modifier module 58 to indicate a difference between two commonly-named elements in merged schema 46. Element modifier module 58 handles elements that are defined in both new schema 10 and previous merged schema 12, but for which the definitions are different. Similarly to the examples above, element modifier module 58 generally encodes indications of each version of the device that utilizes the element, as well as the specific definition to be assigned to that version.

As an example, assume that element "interface-id" occurs with the same scope in both parsed new schema 42 and parsed previous schema 44, but includes different values. In this example, it is assumed that the value that differs is a sub-element "maxInclusive" within "interface-id." In this example, for version 8.1 (corresponding to parsed previous schema 44), maxInclusive is assigned a value of 50, but for version 8.2 (corresponding to parsed new schema 42), max-Inclusive is assigned a value of 100. Accordingly, element modifier module 58 stores both values and corresponding identifiers for each version of the device to which each value applies in merged schema 46. In accordance with the example above, element modifier module 58 produces the following portion of an XSD document for this example:

```
<xsd:element name="interface-id">
    <xsd:annotation>
        <xsd:appinfo>
            <dmi:element-info>
                <maxInclusive>
                    <matches>
                        <match>
                            <release>8.2</release>
                            <value>100</value>
                        </match>
                        <match>
                            <release>8.1</release>
                            <value>50</value>
                        </match>
                    </matches>
                </maxInclusive>
            </dmi:element-info>
        </xsd:appinfo>
    </xsd:annotation>
    <xsd:simpleType>
        <xsd:restriction base="xsd:unsignedInt">
            <xsd:maxInclusive value="100"/>
        </xsd:restriction>
    </xsd:simpleType>
</xsd:element>
```

In this example, because sub-element "maxInclusive" defines a maximum value, element modifier module 58 also defines a "restriction" sub-element that corresponds to the maximum of the maxInclusive definitions for each version. In the example pseudocode above, because the two values are 50 and 100, the restriction declares the maximum value to be 100, using the statement "<xsd:maxInclusive value="100"/>".

Element modifier module 58 also determines a scope for each common element between parsed new schema 42 and parsed previous schema 44, namely whether the scope for each of the two elements is the same or different. The scope of an element generally corresponds to a level in the hierarchy of nodes for the parsed schema at which the element appears. In general, two levels of scope apply: global and local. The XSD standard defines a schema component, such as an element, a complex type, or a simple type, as "global" if the component is an immediate child of <schema>, whereas the component is "local" if it is not an immediate child of <schema>. That is, a component is "local" when the component is nested within another component. A global type or a global element can be referred to by any element or type. A local type cannot be referred to by another element, as it has no name.

With respect to a tree data structure, a global element generally is declared at or nearer to the root element, and a local element generally is declared at or nearer to a leaf element or along a branch. In this manner, elements along a branch can refer to other elements that are declared in an ancestral element (e.g., a parent, a parent's parent, or at the root), but elements in one branch cannot typically refer to elements declared along a separate branch.

In this manner, a scope conflict occurs when a commonly-named element is declared in both new schema 10 and previous merged schema 12, but at different scopes. For example, a conflict occurs when a commonly-named element is declared to be global in one schema and local in another, different schema.

Similarly, type definitions can be defined globally or locally. When a type is defined globally, elements at any location of the tree data structure can declare an element of the global type. When a type is defined locally within an element, the local type can not be referred to by other elements, as local type has no globally accessible name. In some situations, previous merged schema 12 declares a variable of a global type, but new schema 10 declares the variable as a local type.

In this manner, a scope conflict also occurs when two corresponding elements of the same name are declared as different types. Accordingly, element modifier module 58 is configured to address scope conflicts that occur with respect to global and local element types. Examples of scope conflicts, and how they are handled by element modifier module 58, are discussed below with respect to FIGS. 3-7. Several example potential element differences and scope conflicts are listed below with respect to Table 1, although Table 1 is not intended as an exhaustive list of potential element differences and scope conflicts. For example, this disclosure describes additional element differences and scope conflicts not necessarily described by Table 1.

TABLE 1

| Previous Merged Schema | New Schema | Solution |
| --- | --- | --- |
| Local Element Declaration | Local Element Declaration | Compare elements; encode differences with version identifier |
| Global Element Declaration with Type X | Global Element Declaration with Type X | Compare elements; encode differences with version identifier globally; encode local references with version identifier when differences exist |
| Global Element Declaration with Type X | Global Element Declaration with Type Y (a different type) | Preserve Type X definition, define local type comprising a merger of Type X and Type Y |
| Local Element Declaration | Global Element Declaration | Express differences between Local Element and Global Element; add Global Element |
| Global Element Declaration | Local Element Declaration | Preserve Global Element; create local version of global element merged with new local element |

In some examples, merge utility 20 further includes a statistics module (not shown). The statistics module describes statistics regarding new schema 10 relative to previous merged schema 12. For example, the statistics module may present how many new nodes are added, how many nodes are deleted or deprecated, how many nodes are modified (e.g., appinfo sections, in XML), and the like. In one example, after new schema 10 has been merged with previous merged schema 12, the statistics module reports the following types of statistics: the total number of new items for the following kinds of schema components (global element declarations, local element declarations, global type definitions, local type definitions, and appinfo of schema and schema components), the total number of deleted items for the following kinds of schema components (global element declarations, local element declarations, global type definitions, and local type definitions), and the total number of warnings for inconsistencies including "Type Category" of element, "Content Type" of complexType, "Particle Type" of complexType, "Variety" of simpleType, and "Flattened XPath" of element.

FIGS. 3-7 are conceptual diagrams illustrating various scenarios in which a previous merged schema and a new schema result in scope and type conflicts, as well as merged schemas that resolve the scope and type conflicts. Each potential conflict is discussed in greater detail below, as well as how element modifier module 58 resolves each of the scope conflicts when producing merged schema 46.

Figure 3A:
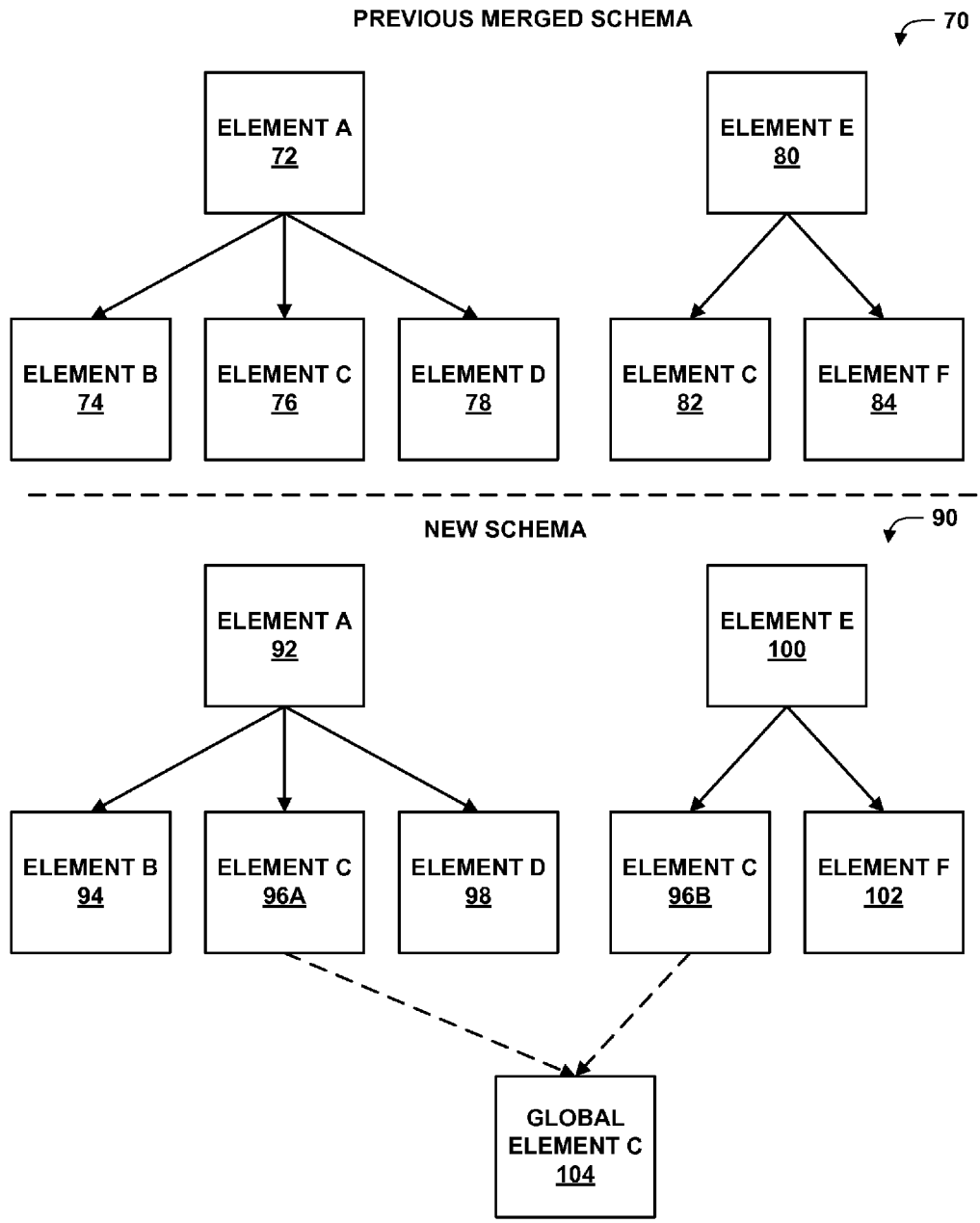
FIGS. 3-7 are block diagrams illustrating various scenarios in which a previous merged schema and a new schema may result in conflicts, as well as merged schemas that resolve the scope conflicts.

FIG. 3A is a conceptual diagram illustrating an example in which previous merged schema 70 and new schema 90 include commonly-named elements at different scopes. In the example of FIG. 3, both previous merged schema 70 and new schema 90 include corresponding "branches" with references to an element named "Element C." Previous merged schema 70 includes Element A 72, which includes sub-elements Element B 74, Element C 76, and Element D 78. Element C 76 is a locally-declared sub-element of Element A 72. Previous merged schema 70 also includes Element E 80, which refers to sub-elements Element C 82 and Element F 84. Element C 82 is a locally-declared sub-element of Element E 80. Although Element C 76 and Element C 82 have the same name, there is no scope or naming conflict within previous merged schema 70, because Element C 76 is local to Element A 72 and Element C 82 is local to Element E 80. Therefore, Element C 76 and Element C 82 are separate, distinct elements, in the example of FIG. 3.

New schema 90 includes Element A 92, which includes sub-elements Element B 94 and Element D 98. Element A 92 corresponds to Element A 72, Element B 94 corresponds to Element A 74, and Element D 98 corresponds to Element D 78. Element A 92 also refers to Element C 96A, which is a reference to Global Element C 104 (as opposed to being a local sub-element). New schema 90 also includes Element E 100, which refers to sub-elements Element F 102 and a reference to Element C 96B. Again, Element E 100 corresponds to Element E 80 and Element F 102 corresponds to Element F 84. Element C 96B is also a reference to Global Element C 104. Element C 96A and Element C 96B are references to Global Element C 104, rather than local elements. Therefore, references to Element C 96A and Element C 96B are redirected to Global Element C 104.

Global Element C 104 includes data that is accessible to any node of any branch of new schema 90. Therefore, any declarations of a local element named Element C would cause a naming conflict and would not be permitted within new schema 90. That is, declarations of a local element named Element C in new schema 90 would cause a parsing error. Accordingly, in attempt to merge previous merged schema 70 with new schema 90, outside the techniques of this disclosure, Element C 76 and Element C 82 would create a parsing error in the form of a scope conflict in a simple merged schema. However, element modifier module 58 handles this conflict in accordance with the techniques of this disclosure, as described with respect to FIG. 3B.

Figure 3B:
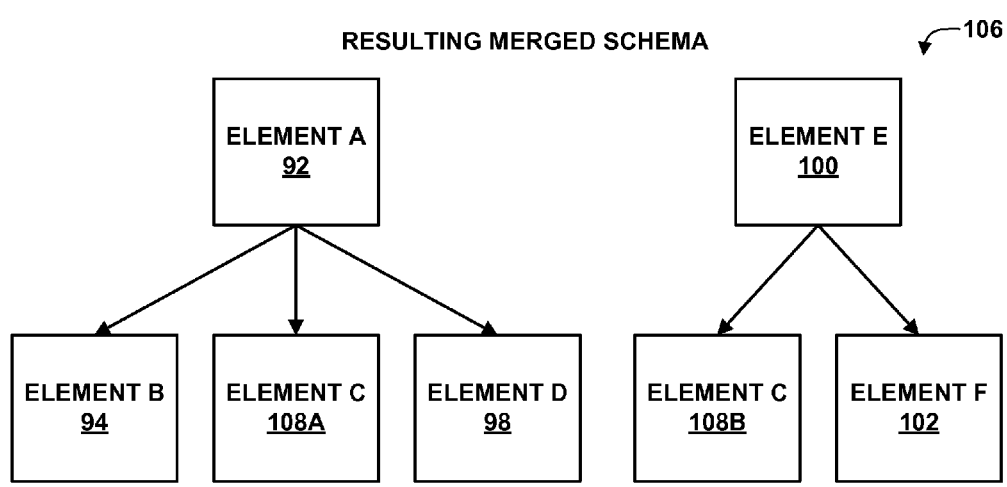

FIG. 3B is a conceptual diagram illustrating the results of element modifier module 58 after merging previous merged schema 70 with new schema 90, in the form of resulting merged schema 106. Element modifier module 58 creates resulting merged schema 106 by merging previous merged schema 70 with new schema 90. In general, for a scope conflict between two commonly-named elements (one of which is global and the other of which is local), element modifier module 58 compares the local element to the global element and expresses the differences between them in corresponding local elements. Element modifier module 58 leaves references to the global element in the new schema that do not conflict with local elements declared in the previous merged schema in tact in the resulting merged schema. In particular, element addition module 54 would add such references to the resulting merged schema 106 without any action by element modifier module 58, because the references are new references without a conflict between an existing element and the new element. For each of the elements without a scope conflict that are the same in both the new schema and the previous merged schema, the element in the resulting merged schema comprises the corresponding element in the previous merged schema, as shown in FIG. 3B.

With respect to the example of FIG. 3B, element modifier module 58 handles the scope conflict between local Element C 76 and Element C 96A's reference to Global Element C 104 by creating local Element C 108A. Local Element C 108A expresses differences between local Element C 76 and Global Element C 104. Element modifier module 58 handles the scope conflict between Element C 82 and Element C 96B's reference to Global Element C 104 in a similar manner by creating local Element C 108B. Local Element C 108B expresses differences between local Element C 82 and Global Element C 104. If another reference to Global Element C 104 had existed in new schema 90, element modifier module 58 would not create a local element, but instead element addition module 54 would add the reference to resulting merged schema 106. In this manner, element modifier module 58 compares local elements of a previous merged schema that are commonly named with a global element in a new schema separately and expresses the differences in each of the local elements in a resulting merged schema respectively.

Figure 4A:
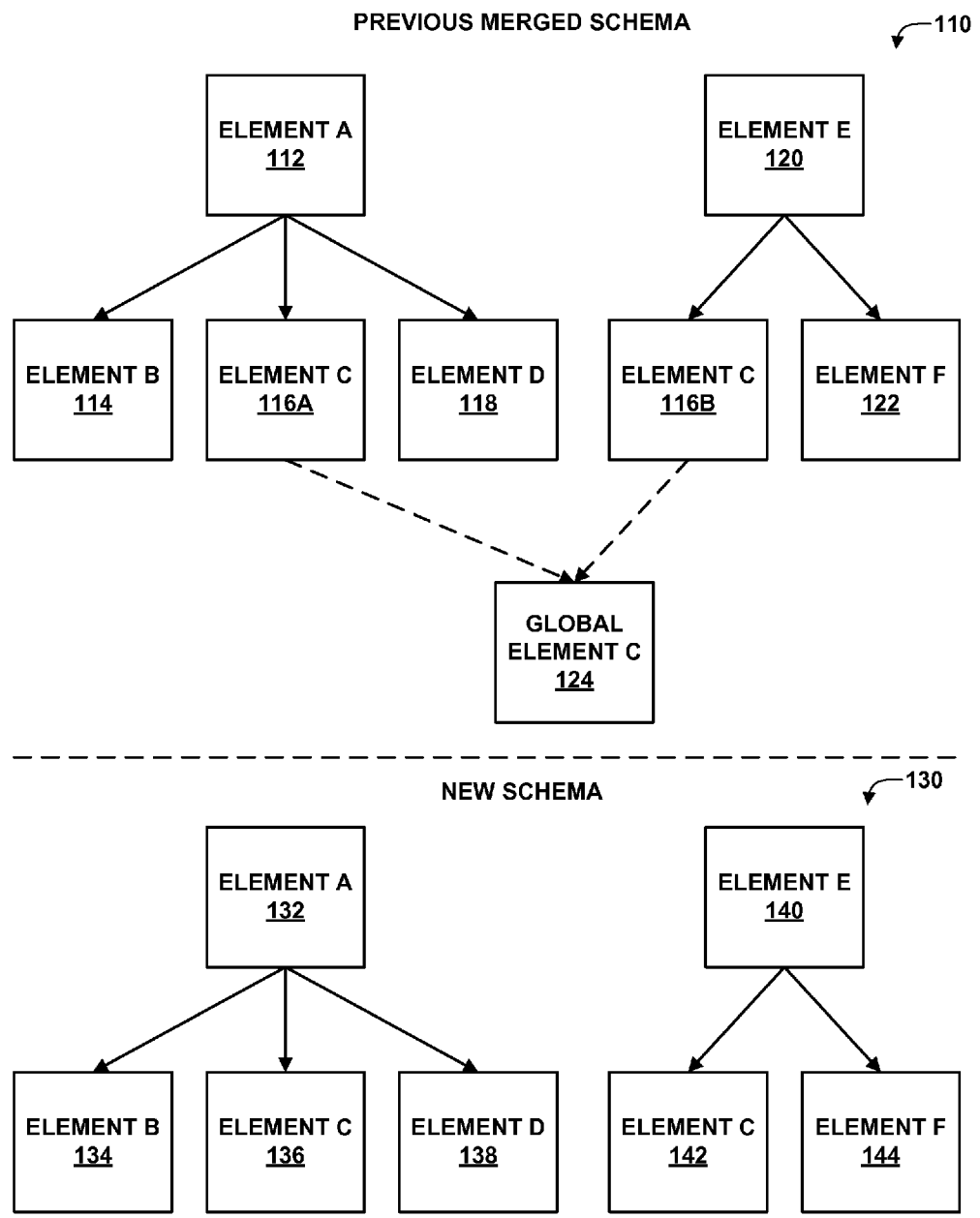

FIG. 4A is a conceptual diagram illustrating another example in which previous merged schema 110 and new schema 130 include commonly-named elements at different scopes. In the example of FIG. 4A, previous merged schema 110 includes Element A 112, which includes sub-elements Element B 114 and Element D 118, as well as Element C 116A, which is a reference to Global Element C 124. Likewise, previous merged schema 110 includes Element E 120, which includes sub-element Element F 122 and Element C 116B, which is also a reference to Global Element C 124.

New schema 130 includes Element A 130, which includes sub-elements Element B 134, Element C 136, and Element D 138, which are each local elements. Element A 130 corresponds to Element A 110, Element B 134 corresponds to Element B 114, and Element D 138 corresponds to Element D 118. However, Element C 136 is declared locally in new schema 130, rather than being a reference to Global Element C 124. Similarly, Element E 140 includes sub-elements Element C 142 and Element F 144. Element E 140 corresponds to Element E 120 and Element F 144 corresponds to Element F 122. Again however, Element C 142 is declared locally in new schema 130, rather than a reference to Global Element C 124.

In this manner, the difference between the example of FIG. 4A and the example of FIG. 3A is that in FIG. 4A, the global element that causes the scope conflict is declared in a previous merged schema, rather than in a new schema. When an element in a previous merged schema refers to a global element and its commonly-named element in a new schema is a local element, this also causes a scope conflict. However, the difference cannot simply be expressed in a global element, because commonly-named elements in the new schema may occur in a plurality of different local scopes and each may be different. To solve the scope conflict, therefore, element modifier module 58 clones the global element as a local element for each instance of the scope conflict and expresses the differences between the cloned global element and the commonly-named local element for each instance of the scope conflict.

Figure 4B:
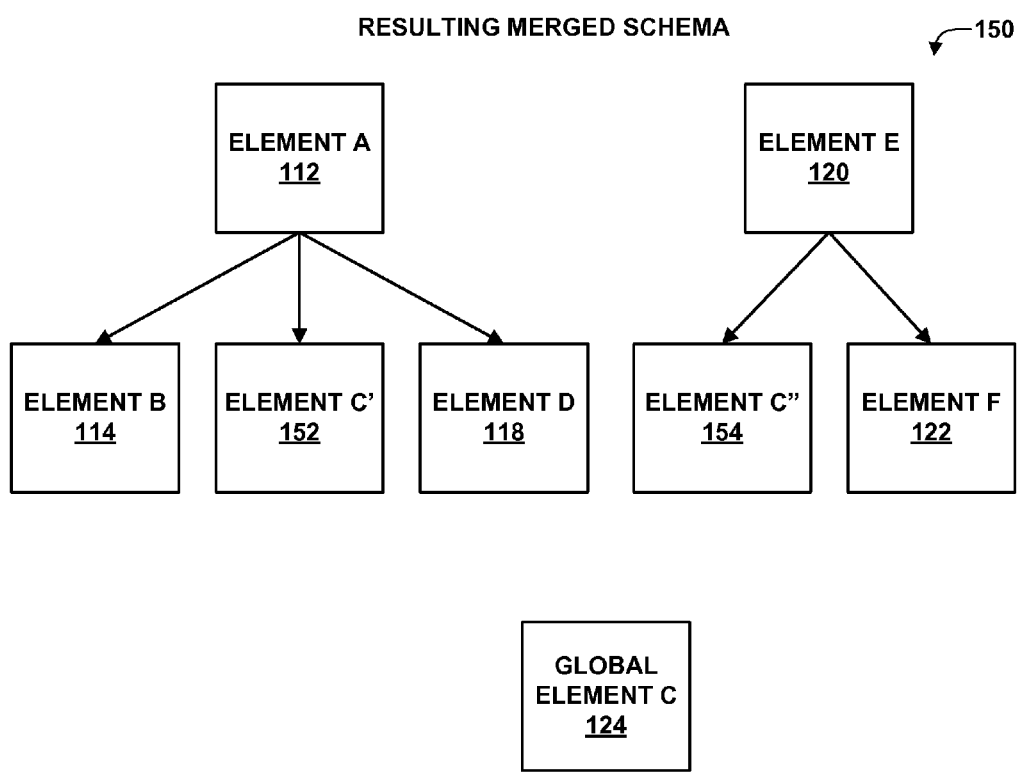

FIG. 4B is a conceptual diagram illustrating the results of element modifier module 58 after merging previous merged schema 110 with new schema 130, in the form of resulting merged schema 150. In the example of FIG. 4B, element modifier module 58 clones Global Element C 124 and merges the differences between the cloned version of Global Element C 124 and Element C 136 to create local Element C' 152. Similarly, element modifier module 58 merges the differences between the cloned version of Global Element C 124 and Element C 142 to create local Element C" 154. For each of the elements without a scope conflict that are the same in both the new schema and the previous merged schema, the element in the resulting merged schema comprises the corresponding element in the previous merged schema, as shown in FIG. 4B.

Figure 5A:
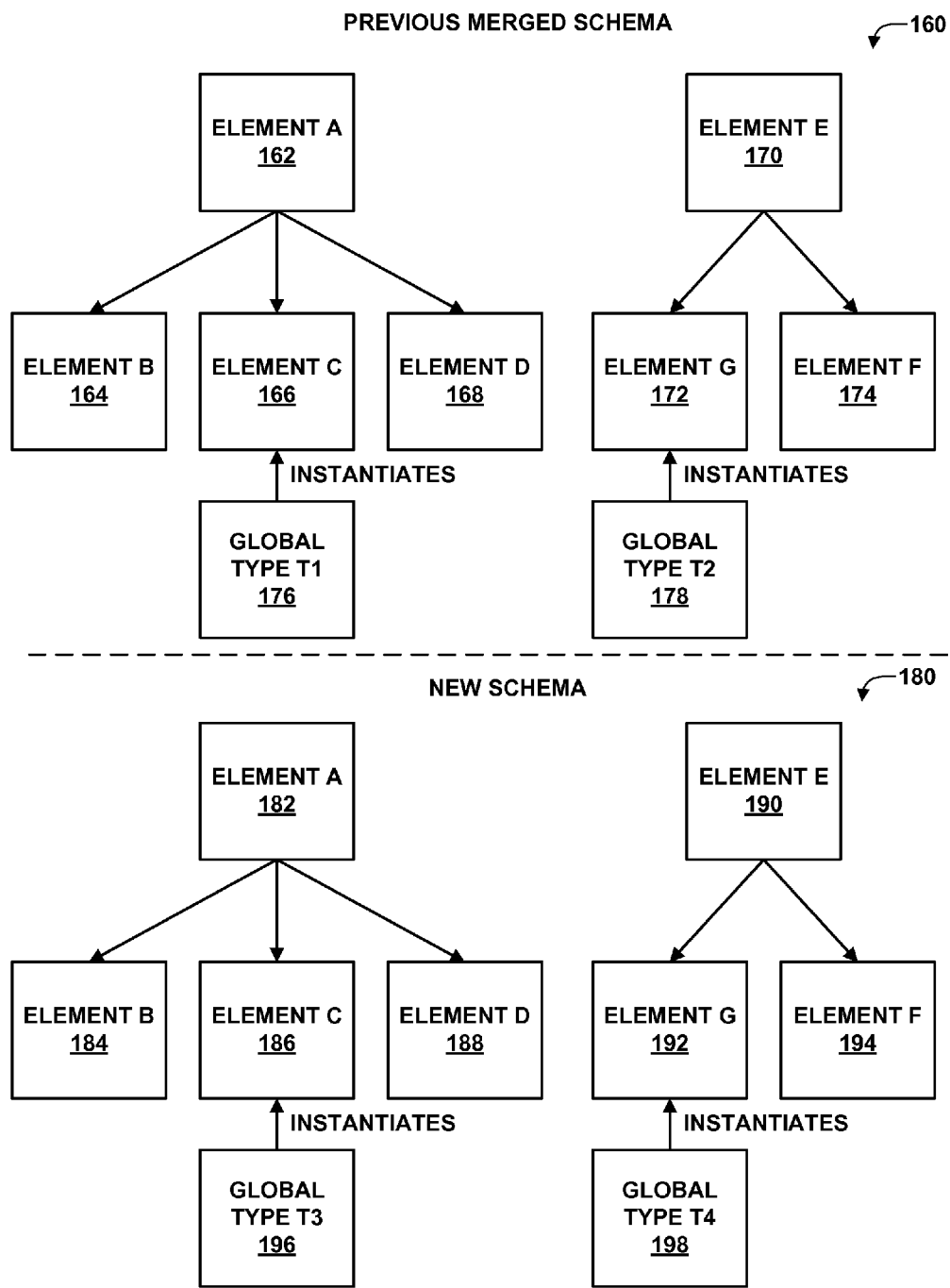

FIG. 5A is a conceptual diagram illustrating an example of a type conflict resulting from instantiations of commonly-named objects from a first global type in a previous merged schema but a second, different global type in a new schema. In the example of FIG. 5A, previous merged schema 160 includes Element A 162, which includes sub-elements Element B 164, Element D 168, and Element C 166, which is instantiated from Global Type T1 176. Previous merged schema 160 also includes Element E 170, which includes sub-elements Element F 174 and Element G 172, which is instantiated from Global Type T2 178. Although illustrated as different global types, in some examples, Global Type T1 176 and Global Type T2 178 are the same type. That is, two sub-elements of distinct elements may instantiate the same global type, by the nature of the global type being global.

New schema 180 includes Element A 182 (corresponding to Element A 162), which includes sub-elements Element B 184 (corresponding to Element B 164) and Element D 188 (corresponding to Element D 164). Element A 182 also includes Element C 186 which is instantiated from Global Type T3 196. New schema 180 also includes Element E 190 (corresponding to Element E 170), which includes sub-elements Element F 194 (corresponding to Element F 174). Element E 190 also includes sub-element Element G 192 that is an instantiation of Global Type T4 198.

It is assumed that, for the example of FIG. 5A, Global Type T3 196 is distinct from Global Type T1 176. It is also assumed that Global Type T4 198 is distinct from Global Type T2 178. Therefore, although Element C 166 and Element C 186 are commonly-named, a type conflict would arise, outside the techniques of this disclosure, in an attempt to simply merge previous merged schema 110 with new schema 130, because Global Type T1 176, from which Element C 166 is instantiated, is distinct from Global Type T3 196, from which Element C 186 is instantiated. Similarly, commonly-named Element G 172 and Element G 192 give rise to a type conflict. These type conflicts arise in the context of XML because the XML Schema Specification states that type definitions must be uniquely identified within a schema. However, element modifier module 58 is configured to merge previous merged schema 110 with new schema 130 without encountering these type conflicts, as described in greater detail with respect to FIG. 5B.

Figure 5B:
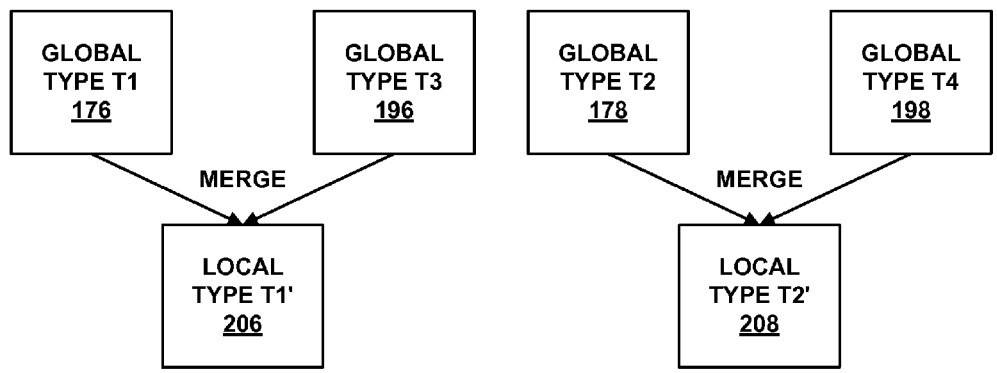

FIG. 5B is a conceptual diagram illustrating an example technique for handling conflicts between two distinct global types. In general, when two commonly-named elements are declared in different schemas from distinct global type definitions, element modifier module 58 leaves the definition of the global type from the previous merged schema in tact, but creates a new type definition comprising a merger of the differences between the two type definitions. In some examples, the new type definition is declared locally, while in other examples, the new type definition is declared globally. In the example of FIG. 5B, element modifier module 58 merges Global Type T1 176 with Global Type T3 196 to produce Local Type T1' 206. Element modifier module 58 also merges Global Type T2 178 with Global Type T4 198 to produce Local Type T2' 208. It should be understood, however, that in other examples, global types are produced for the merger of Global Type T1 176 with Global Type T3 196 and Global Type T2 178 with Global Type T4 198.

Figure 5C:
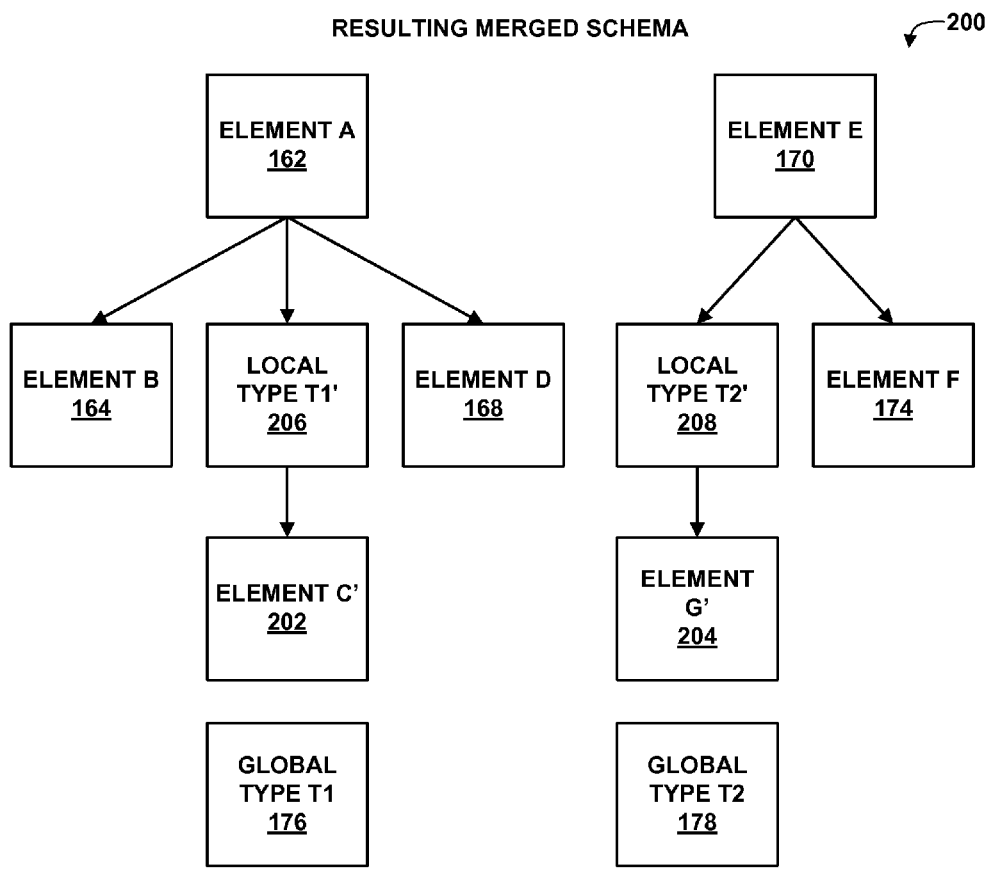

FIG. 5C is a conceptual diagram illustrating the results of element modifier module 58 after merging previous merged schema 160 with new schema 180, in the form of resulting merged schema 200. As shown in, and discussed with respect to, FIG. 5B, element modifier module 58 produces Local Type T1' 206 and Local Type T2' 208, which are used to declare Element C' 202 and Element G' 204, respectively. For each of the elements without a type conflict that are the same in both the new schema and the previous merged schema, the element in the resulting merged schema comprises the corresponding element of the previous merged schema, as shown in FIG. 5C. Element modifier module 58 also preserves Global Type T1 176 and Global Type T2 178, in case other elements (which are not shown in the example of FIGS. 5A-5C) are declared from these global types. For elements that are declared in new schema 180 from either of Global Type T3 196 or Global Type T4 198 without a type conflict (also not shown in the example of FIGS. 5A-5C), element addition module 54 would add the elements and corresponding ones of Global Type T3 196 and Global Type T4 198 as necessary, so element modifier module 58 does not add Global Type T3 196 and Global Type T4 198 by default.

Figure 6A:
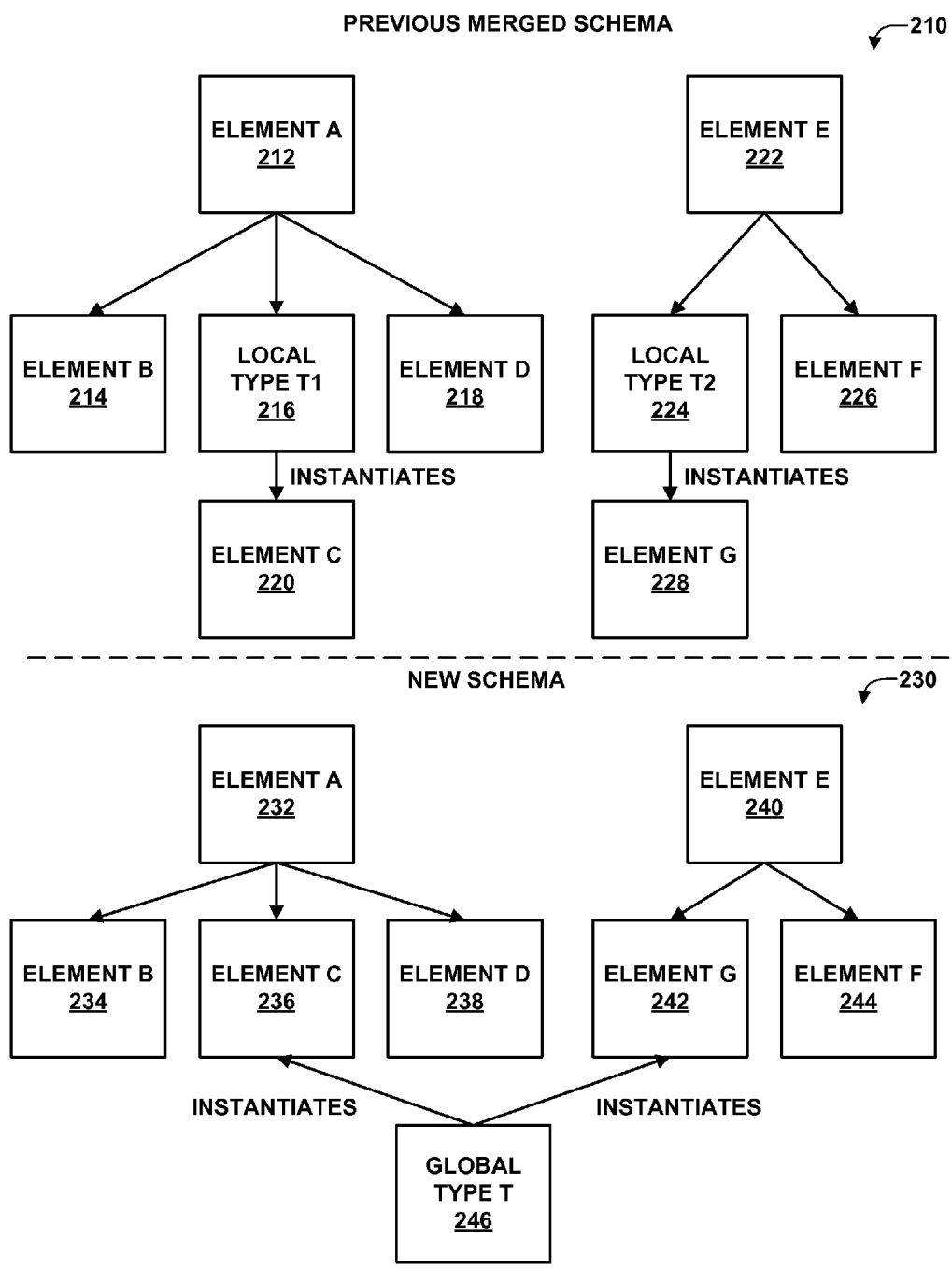

FIG. 6A is a conceptual diagram illustrating an example of a type conflict resulting from instantiations of commonly-named objects from a local type in a previous merged schema but a global type in a new schema. Previous merged schema 210 includes Element A 212, which includes sub-elements Element B 214, Element C 220, and Element D 218. Element C 220 is instantiated from Local Type T1 216, which comprises a type that is defined locally, that is, within the scope of Element A 212. Previous merged schema 210 also includes Element E 222, which includes sub-elements Element F 226 and Element G 228. Element G 228 is instantiated from Local Type T2 224, which comprises a type defined locally within the scope of Element E 222. In this manner, elements of type Local Type T1 can only be declared as sub-elements of Element A 212, and elements of type Local Type T2 can only be declared as sub-elements of Element E 222, in the example of FIG. 6A. It should further be understood that another local type named Local Type T1 could also be defined in another local scope outside the scope of Element A 212.

New schema 230 includes Element A 232 (corresponding to Element A 212), which includes sub-elements Element B 234 (corresponding to Element B 214), Element C 236, and Element D 238 (corresponding to Element D 218). New schema 230 also includes Element E 240 (corresponding to Element E 222), which includes sub-elements Element F 244 (corresponding to Element F 226) and Element G 242. Element C 236 and Element G 242 are instantiated from Global Type T 246, which comprises a type defined globally within the scope of new schema 230. Element C 236 and Element G 242 are commonly-named with Element C 220 and Element G 228, respectively.

In this manner, two or more elements of type Global Type T may be declared in different local scopes scope of distinct elements of new schema 230, as shown with respect to Element C 236 and Element G 242. Element C 220 and Element C 236 will therefore cause a type conflict, and Element G 228 and Element G 242 will also cause a type conflict, in attempt to merge previous merged schema 210 with new schema 230, outside the techniques of this disclosure. However, element modifier module 58 handles this conflict in accordance with the techniques of this disclosure, as described with respect to FIG. 6B.

Figure 6B:
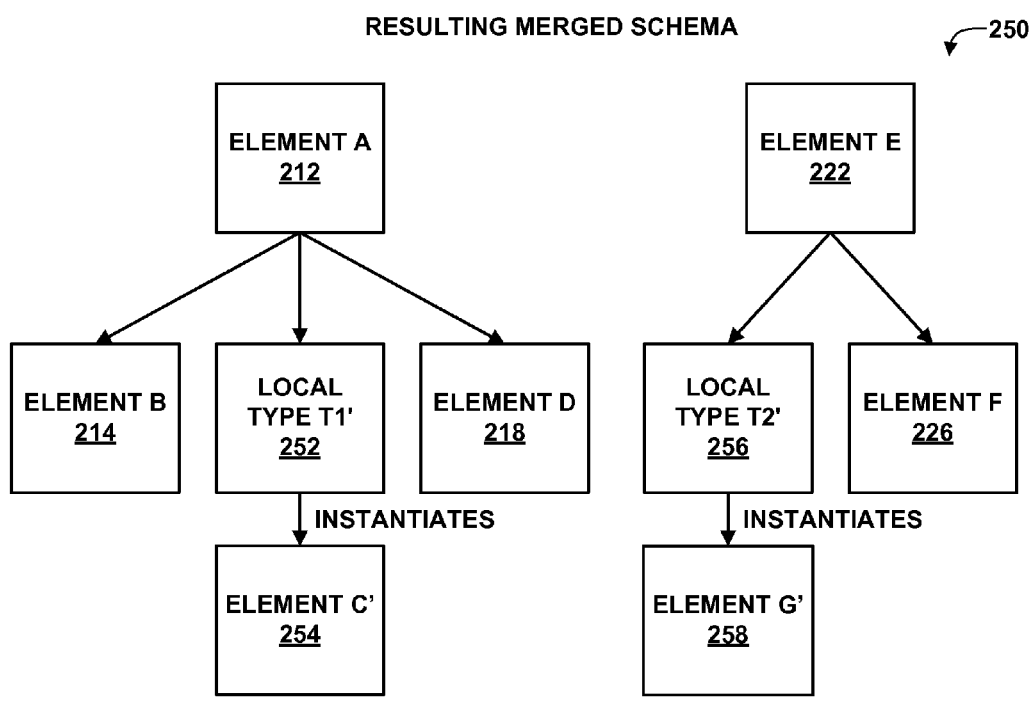

FIG. 6B is a conceptual diagram illustrating the results of element modifier module 58 after merging previous merged schema 210 with new schema 230, in the form of resulting merged schema 250. In general, element modifier module 58 compares type definitions of commonly-named elements for which a local type is defined in a previous merged schema and a global type is defined in a new schema, and expresses the differences separately in corresponding local types in a resulting merged schema. Element modifier module 58 need not include Global Type T 246 in resulting merged schema 250, because if any elements are instantiated from Global Type T 246 that do not result in a conflict, element addition module 54 will add Global Type T 246 to resulting merged schema 250.

Element modifier module 58 handles the conflict described above with respect to the example of FIG. 6A by producing Local Type T1' 252 by merging Local Type T1 216 with Global Type T 246 and Local Type T2' 256 by merging Local Type T2 224 with Global Type 246. Element C' 254 is an instantiation of an object of Local Type T1' 252, and Element G' 258 is an instantiation of an object of type Local Type T2' 256. For each of the elements without a type conflict that are the same in both the new schema and the previous merged schema, the element in the resulting merged schema comprises the corresponding element of the previous merged schema, as shown in FIG. 6B.

Figure 7A:
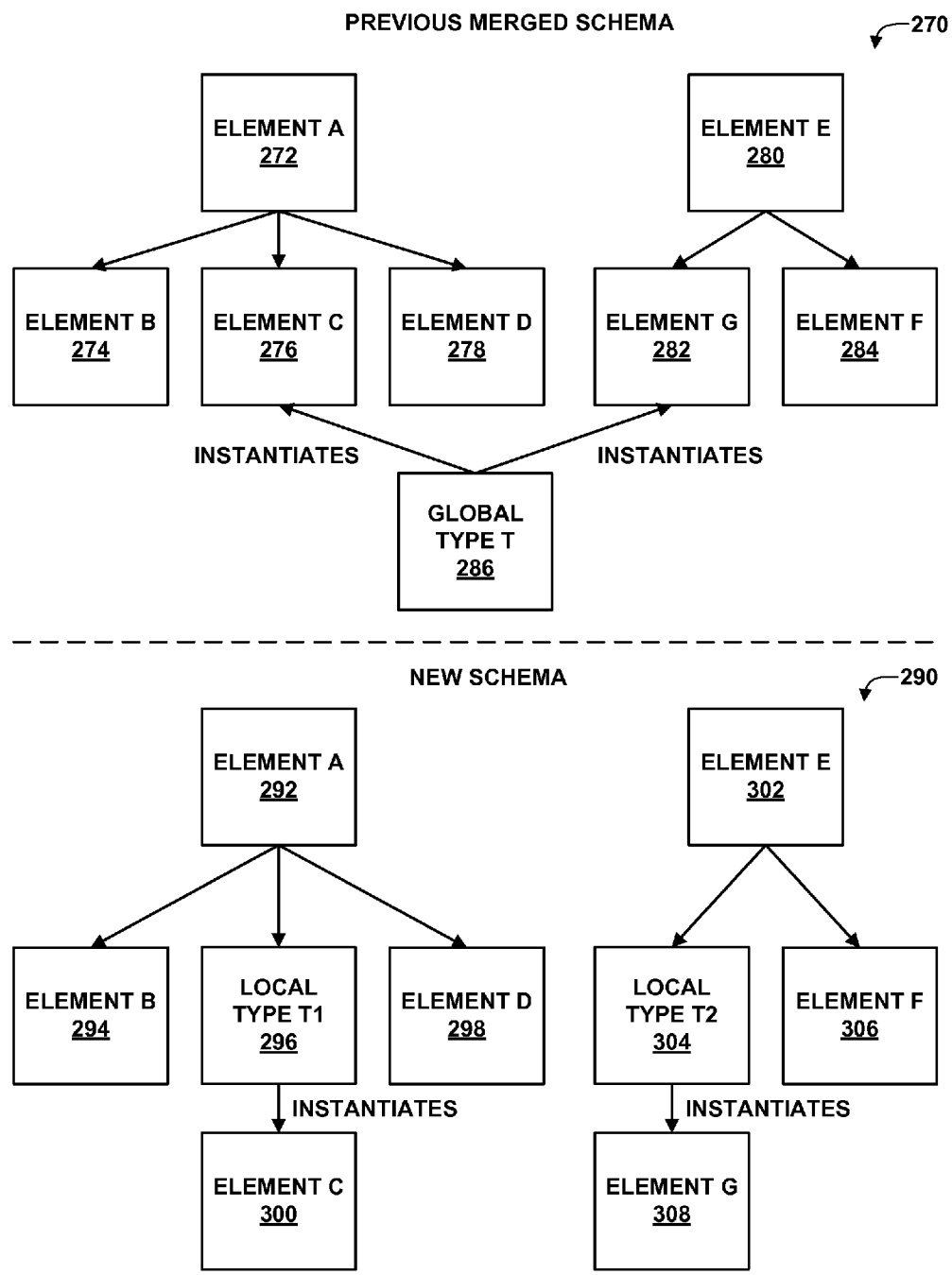

FIG. 7A is a conceptual diagram illustrating an example of a type conflict resulting from instantiations of commonly-named objects from a global type in a previous merged schema but a local type in a new schema. Previously merged schema 270 includes Element A 272, which includes sub-elements Element B 274, Element D 278, and Element C 276. Previous merged schema 270 also Element E 280, which includes sub-elements Element F 284 and Element G 282. Element C 276 and Element G 282 are instantiations of Global Type T 286.

New schema 290 includes Element A 292 (corresponding to Element A 272), which includes sub-elements Element B 294 (corresponding to Element B 274), Element C 300, and Element D 298 (corresponding to Element D 278). Element C 300 is instantiated from Local Type T1 296, which is local to the scope of Element A 292. New schema 230 also includes Element E 302 (corresponding to Element E 280), which includes sub-elements Element F 306 (corresponding to Element F 284) and Element G 308. Element G 242 is instantiated from Local Type T2 304, which is local to the scope of Element E 302. Element C 300 and Element G 308 are commonly-named with Element C 276 and Element G 282, respectively.

Element C 276 and Element C 300 will therefore cause a type conflict, and Element G 282 and Element G 308 will also cause a type conflict, in attempt to merge previous merged schema 270 with new schema 290, outside the techniques of this disclosure. However, element modifier module 58 handles this conflict in accordance with the techniques of this disclosure, as described with respect to FIG. 7B.

Figure 7B:
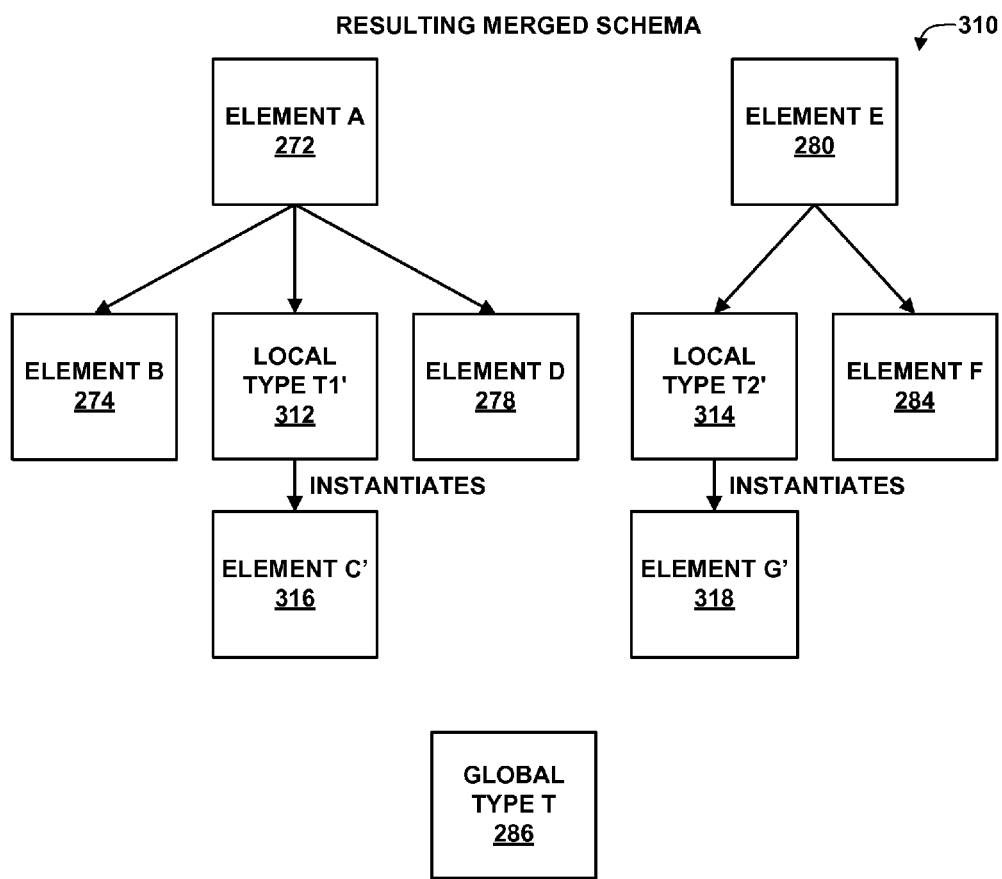

FIG. 7B is a conceptual diagram illustrating the results of element modifier module 58 after merging previous merged schema 270 with new schema 290, in the form of resulting merged schema 310. Because Global Type T 286 may be referred to by other elements in previous merged schema 270 that are not shown in the example of FIG. 7A, element modifier module 58 does not simply express the differences between Global Type T 286 and conflicting local types declared in new schema 290, in this example, Local Type T1 296 and Local Type T2 304. Instead, for each conflicting type, element modifier module 58 clones the global type and expresses the differences in respective local types.

In the example of FIG. 7B, element modifier module 58 expresses differences between Global Type T 286 and Local Type T1 296 in a newly created Local Type T1' 312. Element modifier module 58 also expresses differences between Global Type T 286 and Local Type T2 304 in newly created Local Type T2' 314. Element C' 316 is an instantiated element of Local Type T1' 312, and Element G' is an instantiated element of Local Type T2' 314. For each of the elements without a type conflict that are the same in both the new schema and the previous merged schema, the element in the resulting merged schema comprises the corresponding element of the previous merged schema, as shown in FIG. 7B. Element modifier module 58 also preserves Global Type T 286, in case other elements of previous merged schema 270 are declared from Global Type T 286.

The following is an example portion of a previous merged schema. In particular, in this example, the previous merged schema includes a type named "ipaddress" that is declared globally. The global type "ipaddress" also defines a restriction "maxLength" with a value of "200," in this example.

```
<?xml version="1.0" encoding="UTF-8"?>
<xsd:schema xmlns:xsd="http://www.w3.org/2001/XMLSchema"
    xmlns:dmi="http://xml.juniper.net/dmi">
  <xsd:element name="configuration">
    <xsd:complexType>
      <xsd:sequence>
        <xsd:element name="system" type="juniper-system">
          <xsd:annotation>
            <xsd:documentation>System parameters</xsd:documentation>
            <xsd:appinfo>
              <remove-if-empty/>
            </xsd:appinfo>
          </xsd:annotation>
        </xsd:element>
      </xsd:sequence>
    </xsd:complexType>
  </xsd:element>
  <xsd:simpleType name="ipaddress">
    <xsd:restriction base="xsd:string">
      <xsd:maxLength value="200"/>
      <xsd:pattern value="((2[0-4]\d|25[0-5]|[01]?\d\d?)\.){3}(2[0-4]\d|25[0-5]|[01]?\d\d?)"/>
    </xsd:restriction>
  </xsd:simpleType>
```

```
<xsd:complexType name="juniper-system">
<xsd:sequence>
   <xsd:element name="comment">
      <xsd:simpleType>
         <xsd:restriction base="xsd:string">
            <xsd:minLength value="1"/>
            <xsd:maxLength value="1024"/>
         </xsd:restriction>
      </xsd:simpleType>
   </xsd:element>
   <xsd:element name="support-product">
      <xsd:complexType>
         <xsd:sequence>
            <!--Global Type Vs. Local Type-->
            <xsd:element name="ip" type="ipaddress"/>
         </xsd:sequence>
      </xsd:complexType>
   </xsd:element>
   <xsd:element name="interface" minOccurs="0" maxOccurs="unbounded">
      <xsd:complexType>
         <xsd:sequence>
            <xsd:element name="interface-name" type="xsd:string"/>
            <xsd:element name="ipaddress" type="ipaddress"/>
         </xsd:sequence>
      </xsd:complexType>
   </xsd:element>
</xsd:sequence>
</xsd:complexType>
</xsd:schema>
```

The following is an example of a new schema. In particular, in this example, the new schema defines a local type named "ipaddress" with a restriction on "maxLength" with a value of "400." Therefore, an attempt to simply merge this example of a new schema with the above example of a previous merged schema would cause a global/local type definition conflict, as well as a conflict between sub-elements of the type definitions. However, element modifier module 58 is configured to handle this sort of conflict in accordance with the techniques of this disclosure when merging these two schemas, as described in greater detail below.

```
<?xml version="1.0" encoding="UTF-8"?>
<xsd:schema xmlns:xsd="http://www.w3.org/2001/XMLSchema"
   xmlns:dmi="http://xml.juniper.net/dmi">
<xsd:element name="configuration">
<xsd:complexType>
   <xsd:sequence>
      <xsd:element name="system" type="juniper-system">
         <xsd:annotation>
            <xsd:documentation>System parameters</xsd:documentation>
            <xsd:appinfo>
               <remove-if-empty/>
            </xsd:appinfo>
         </xsd:annotation>
      </xsd:element>
   </xsd:sequence>
</xsd:complexType>
</xsd:element>
<xsd:simpleType name="ipaddress">
<xsd:restriction base="xsd:string">
   <xsd:maxLength value="200"/>
   <xsd:pattern value="((2[0-4]\d|25[0-5]|[01]?\d\d?)\.){3}(2[0-4]\d|25[0-5]|[01]?\d\d?)"/>
</xsd:restriction>
</xsd:simpleType>
<xsd:complexType name="juniper-system">
<xsd:sequence>
   <xsd:element name="comment">
      <xsd:simpleType>
         <xsd:restriction base="xsd:string">
            <xsd:minLength value="1"/>
            <xsd:maxLength value="1024"/>
         </xsd:restriction>
      </xsd:simpleType>
   </xsd:element>
   <xsd:element name="support-product">
      <xsd:complexType>
         <xsd:sequence>
            <xsd:element name="ip" type="ipaddress"/>
         </xsd:sequence>
      </xsd:complexType>
   </xsd:element>
   <xsd:element name="interface" minOccurs="0" maxOccurs="unbounded">
      <xsd:complexType>
         <xsd:sequence>
            <xsd:element name="interface-name" type="xsd:string"/>
            <!--Global Type Vs. Local Type-->
            <xsd:element name="ipaddress">
               <xsd:simpleType>
                  <xsd:restriction base="xsd:string">
                     <xsd:maxLength value="400"/>
                     <xsd:pattern value="((2[0-4]\d|25[0-5]|[01]?\d\d?)\.){3}(2[0-4]\d|25[0-5]|[01]?\d\d?)"/>
                  </xsd:restriction>
               </xsd:simpleType>
            </xsd:element>
         </xsd:sequence>
      </xsd:complexType>
   </xsd:element>
</xsd:sequence>
</xsd:complexType>
</xsd:schema>
```

The following pseudocode is an example of a resulting merged schema, which results from merging the above example previous merged schema and new schema in accordance with the techniques of this example. In particular, in this example, element modifier module 58 defines a local type named "ipaddress" that includes a "matches" tag for sub-element "max-bytes." "Match" tags within the "matches" tag define the differences for different versions of a platform to which the merged schema corresponds. Element modifier module 58 has declared matches for OS version "Junos8.1," for which "max-bytes" has a value of "200," corresponding to the previous merged schema example above, as well as for OS version "Junos8.2," for which "max-bytes" has a value of "400," corresponding to the new schema example above. Element modifier module 58 further declares an absolute restriction on "max-bytes" by declaring that maxLength has a value of "400," which corresponds to the maximum of "400" and "200."

```xml
<?xml version="1.0" encoding="UTF-8"?>
<xsd:schema xmlns:dmi="http://xml.juniper.net/dmi"
    xmlns:xsd="http://www.w3.org/2001/XMLSchema">
  <xsd:element name="configuration">
    <xsd:complexType>
      <xsd:sequence>
        <xsd:element name="system" type="juniper-system">
          <xsd:annotation>
            <xsd:documentation>System parameters</xsd:documentation>
            <xsd:appinfo>
              <remove-if-empty/>
            </xsd:appinfo>
          </xsd:annotation>
        </xsd:element>
      </xsd:sequence>
    </xsd:complexType>
  </xsd:element>
  <xsd:simpleType name="ipaddress">
    <xsd:restriction base="xsd:string">
      <xsd:maxLength value="200"/>
      <xsd:pattern value="((2[0-4]\d|25[0-5]|[01]?\d\d?)\.){3}(2[0-4]\d|25[0-5]|[01]?\d\d?)"/>
    </xsd:restriction>
  </xsd:simpleType>
  <xsd:complexType name="juniper-system">
    <xsd:sequence>
      <xsd:element name="comment">
        <xsd:simpleType>
          <xsd:restriction base="xsd:string">
            <xsd:minLength value="1"/>
            <xsd:maxLength value="1024"/>
          </xsd:restriction>
        </xsd:simpleType>
      </xsd:element>
      <xsd:element name="support-product">
        <xsd:complexType>
          <xsd:sequence>
            <!--Global Type Vs. Local Type-->
            <xsd:element name="ip" type="ipaddress"/>
          </xsd:sequence>
        </xsd:complexType>
      </xsd:element>
      <xsd:element name="interface" minOccurs="0" maxOccurs="unbounded">
        <xsd:complexType>
          <xsd:sequence>
            <xsd:element name="interface-name" type="xsd:string"/>
            <xsd:element name="ipaddress">
              <xsd:annotation>
                <xsd:appinfo>
                  <dmi:element-info>
                    <max-bytes>
                      <matches>
                        <match>
                          <os-version>junos8.1</os-version>
                          <value>200</value>
                        </match>
                        <match>
                          <os-version>junos8.2</os-version>
                          <value>400</value>
                        </match>
                      </matches>
                    </max-bytes>
                  </dmi:element-info>
                </xsd:appinfo>
              </xsd:annotation>
              <xsd:simpleType>
                <xsd:restriction base="xsd:string">
                  <xsd:maxLength value="400"/>
                  <xsd:pattern value="((2[0-4]\d|25[0-5]|[01]?\d\d?)\.){3}(2[0-4]\d|25[0-5]|[01]?\d\d?)"/>
                </xsd:restriction>
              </xsd:simpleType>
            </xsd:element>
          </xsd:sequence>
        </xsd:complexType>
      </xsd:element>
    </xsd:sequence>
  </xsd:complexType>
</xsd:schema>
```

Figure 8:
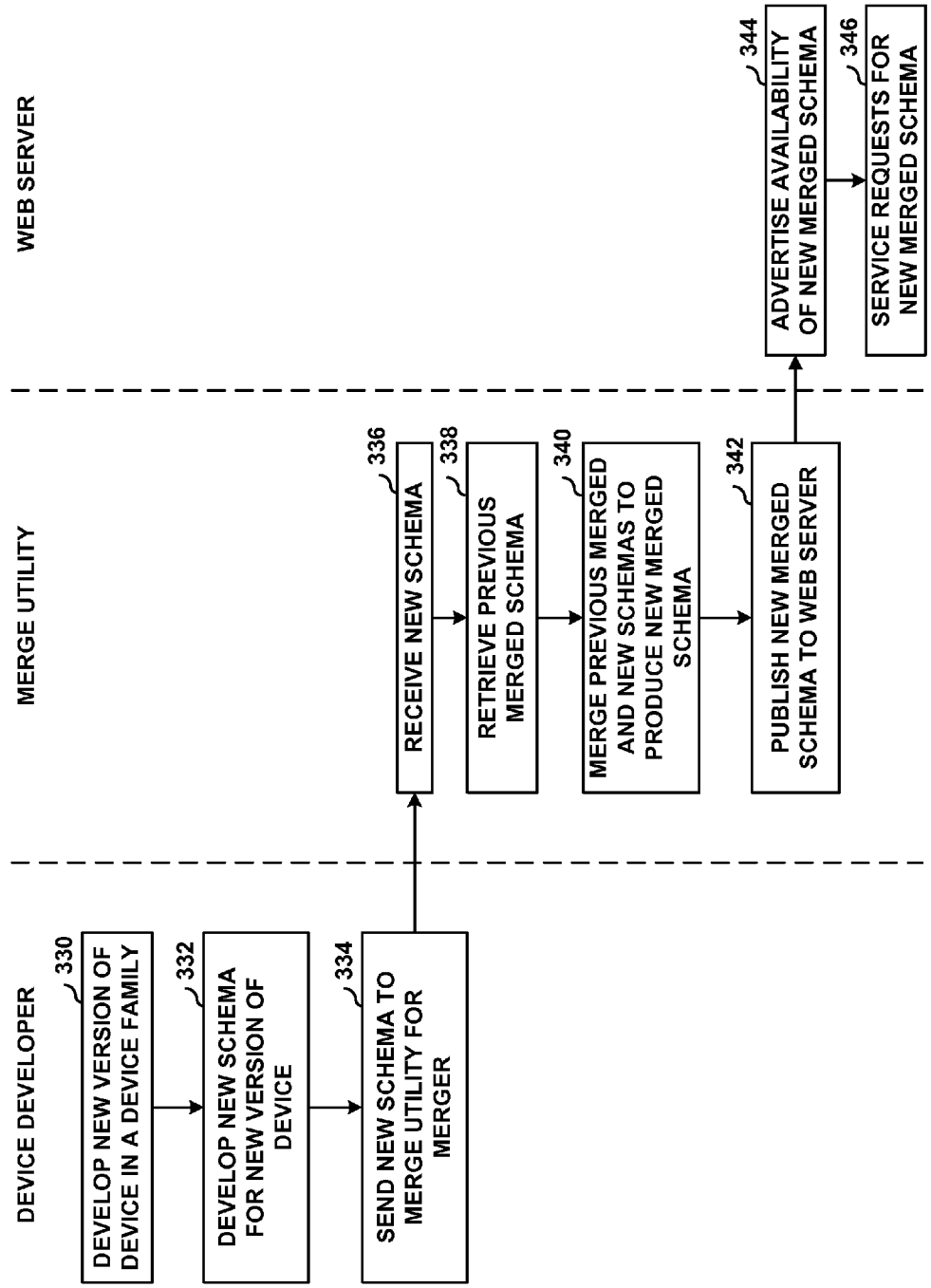
FIG. 8 is a flowchart illustrating an example method for producing and publishing a new merged schema from a new schema and a previous merged schema.

FIG. 8 is a flowchart illustrating an example method for producing a resulting merged schema, also referred to in this disclosure as a new merged schema, from a new schema and a previous merged schema. For purposes of explanation, the example method of FIG. 8 is described with respect to new schema 10, previous merged schema 12, and new merged schema 14 (FIG. 1). Initially, device developer 24 creates a new version of a device in a particular device family (330). Device developer 24 also creates new schema 10 for the new version of the device (332). Device developer 24 provides new schema 10 and merged schema 12 as input to merge utility 20 to produce new merged schema 14 that explicitly and coherently specifies the differences between previous merged schema 12 and new schema 10 in a way that conforms to the requirements of compliant XSD files (334). In one example, merge utility 20 is a program executed by a processor of a computing device of device developer 24 (instructions for which are stored in a computer-readable storage medium), in which case device developer 24 "sends" new schema 10 to merge utility 20 by executing merge utility 20 and providing new schema 10 to merge utility 20 as input.

Merge utility 20 receives new schema 10 from device developer 24 (336). Merge utility 20 then retrieves previous merged schema 12 (338). In some examples, merge utility 20 retrieves previous merged schema 12 from web server 22. Merge utility 20 then merges new schema 10 with previous merged schema 12 to produce new merged schema 14 (340). In general, this merger includes expressing differences between new schema 10 and previous merged schema 12. These differences include different values for elements and/or sub-elements, different scope definitions of elements, differences between type definitions, and scopes in which types are defined, such as local and global. Merge utility 20 then publishes new merged schema 14 to web server 22 (342).

Web server 22 advertises the availability of new merged schema 14 (344). In one example, web server 22 generates a link to new merged schema 14 and places the link in a retrievable location. In some examples, an administrator modifies a webpage to include the link to new merged schema 14. Web server 22 also services requests for new merged schema 14 (346). For example, when web server 22 receives a hypertext transfer protocol (HTTP) or file transfer protocol (FTP) request for new merged schema 14, web server 22 sends new merged schema 14 to the entity that sent the request for new merged schema 14. In some examples, web server 22 utilizes HTTP security (HTTPS) to securely transfer new merged schema 14 to the requesting entity. In some examples, web server 22 first requests validation information from the requesting entity, such as a login identifier and a password.

Figure 9:
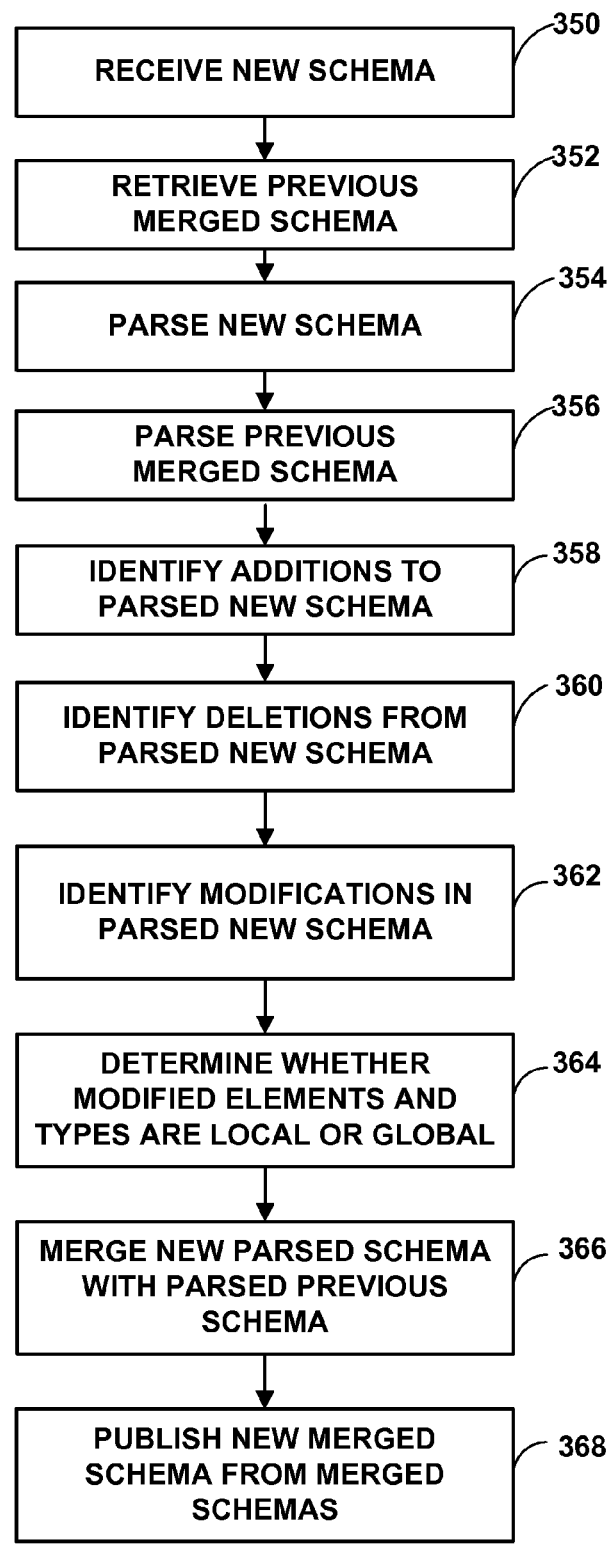
FIG. 9 is a flowchart illustrating an example method for generating a new merged schema from a new schema and a previous merged schema.

FIG. 9 is a flowchart illustrating an example method for generating a new merged schema from a new schema and a previous merged schema. For purposes of explanation, the example method of FIG. 9 is described with respect to new schema 10, previous merged schema 12, and new merged schema 14 (FIG. 1). Initially, merge utility 20 receives new schema 10 from device developer 24 (350). Merge utility 20 then retrieves previous merged schema 12, e.g., from local memory or from web server 22 (352).

Schema parser module 40 (FIG. 2) then parses new schema 10 to produce parsed new schema 42 (354). Schema parser module 40 also parses previous merged schema to produce parsed previous schema 44 (356). In some examples, schema parser module 40 generates parsed new schema 42 and parsed previous schema 44 in respective tree data structures. Schema parser module 40 passes parsed new schema 42 and parsed previous schema 44 to schema merger module 50 to be merged.

Schema merger module 50 uses comparator module 52 to identify differences between parsed new schema 42 and parsed previous schema 44. In some examples, comparator module 52 generates respective symbol tables for each of parsed new schema 42 and parsed previous schema 44 to identify such differences. In particular, comparator module 52 identifies additions to parsed new schema 42 (358), deletions from parsed new schema 42 (360), and modifications to elements and defined types of parsed new schema 42 (362). Comparator module 52 calls appropriate ones of element addition module 54, element removal module 56, and element modifier module 58 to merge new parsed schema 42 with parsed previous schema 44 (366).

During the schema merging procedure, both the element declaration and the type declaration are compared for each node. Because of the complexity and flexibility of XML schema specification, different syntax can be used to represent semantically identical definitions. Both global and local element declarations can be utilized to define an element in the semantically identical way, for example, if an element in one schema refers to a global element, and the corresponding element in the other schema is a local element. In addition, the global element could be referred to in more than one place, where the definitions of those corresponding local elements are different. The techniques of this disclosure cover all the relations of the global vs. local element declarations, as described herein.

Both local type definitions and global type definitions can be employed to define the data type of an element. Accordingly, a first type definition in one schema may refer to a "Global" type definition, and the corresponding (second) type definition in the other schema could be an anonymous "Local" type definition. This global type definition could be used in more than one node. What's more, two corresponding elements in two different schemas may use different global types as their type definitions. The techniques of this disclose also handle these situations, as described herein.

In one example, comparator module 52 traverses parsed new schema 42 and, for each element of parsed new schema 42, determines whether a corresponding element exists in parsed previous schema 44. When a corresponding element exists, comparator module 52 further determines whether the element in parsed previous schema 44 is identical to the corresponding element of parsed new schema 42. When the elements are identical, comparator module 52 uses the corresponding element of parsed previous schema 44 for merged schema 46. When the elements are not identical, comparator module 52 calls element modifier module 58 to merge the two elements and express differences in merged schema 46. When no corresponding element is found, comparator module 52 calls element addition module 54 to add the element to merged schema 46. For modified elements and types, comparator module 52 determines whether the corresponding elements and/or types are both local, both global, or one is local and one is global (364).

In one example, as corresponding elements of parsed previous schema 44 are identified and merged into merged schema 46, comparator module 52 deletes the elements from parsed previous schema 44. Thereby, once parsed new schema 42 has been fully traversed, comparator module 52 passes any remnants of parsed previous schema 44 to element removal module 56 for incorporation into merged schema 46.

In another example, rather than deleting elements from parsed previous schema 46, comparator module 52 traverses parsed previous schema 44 and identifies corresponding elements of parsed new schema 42. When a corresponding element is discovered, whether different or not, comparator module 52 skips the element of parsed previous schema 44. For elements of parsed previous schema 44 that do not include a corresponding element in parsed new schema 42, comparator module 52 calls element removal module 56 to include the element of parsed previous schema 44 in merged schema 46.

Once schema merger module 50 has merged parsed new schema 42 with parsed previous schema 44 to form merged schema 46, schema merger module sends merged schema 46 to publication module 60. Publication module 60 publishes merged schema 46 to web server 22 (368). In this manner, merge utility 20 produces new merged schema 14 from new schema 10 and previous merged schema 12 that expresses differences between new schema 10 and previous merged scheme 12. Network management system 30 is then able to retrieve new merged schema 14 from web server 22 and use new merged schema 14 to manage different versions of managed devices 32 of the same device family.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

What is claimed is:

1. A method comprising:
receiving, with a computing device, a first schema to be used for controlling generation of configuration data for a first version of a device in a device family;
receiving, with the computing device, a second, different schema to be used for controlling generation of configuration data for a second, different version of the device in the device family;
automatically identifying, with a software utility executed by the computing device, differences between the first schema and the second schema; and
automatically merging, with the software utility, the first schema and the second schema to produce a resulting merged schema to be used for controlling generation of configuration data for both the first version of the device and the second version of the device according to the identified differences between the first schema and the second schema, wherein the resulting merged schema expresses the identified differences between the first schema and the second schema and includes a single instance of each common portion between the first schema and the second schema.

2. The method of claim 1, wherein the first schema comprises a merged schema to be used for managing the first version of the device and a third, different version of the device in the device family, wherein the third version of the device is different from both the first version and the second version.

3. The method of claim 1, wherein receiving the second schema comprises receiving the second schema from a developer of the second version of the device.

4. The method of claim 1, wherein receiving the first schema comprises retrieving the first schema from a data repository internal to the computing device.

5. The method of claim 1,
wherein automatically identifying differences between the first schema and the second schema comprises processing the first schema and the second schema with the software utility to automatically identify an added element of the second schema, wherein the added element is present in the second schema but not in the first schema; and
wherein automatically merging, with the software utility, the first schema and the second schema comprises automatically adding the added element to the resulting merged schema and generating the resulting merged schema with the software utility to include an indicator that the added element is available for only the second version of the device and not the first version of the device.

6. The method of claim 5, wherein generating the resulting merged schema with the software utility to include an indicator comprises generating a <match> tag that indicates that the added element is available for the second version of the device using a <release> tag.

7. The method of claim 1,
wherein automatically identifying differences between the first schema and the second schema comprises processing the first schema and the second schema with the software utility to automatically identify a removed element of the first schema, wherein the removed element is present in the first schema but not in the second schema; and
wherein automatically merging, with the software utility, the first schema and the second schema comprises automatically adding the removed element to the resulting merged schema and generating the resulting merged schema with the software utility to include an indicator that the removed element is available for only the first version of the device and not available for the second version of the device.

8. The method of claim 7, wherein generating the resulting merged schema with the software utility to include an indicator comprises generating a <match> tag that indicates that the removed element is not available for the second version of the device using a <release> tag.

9. The method of claim 1,
wherein automatically identifying differences between the first schema and the second schema comprises processing the first schema and the second schema with a software utility that automatically identifies a modified element of the second schema, wherein the modified element of the second schema corresponds to a corresponding element of the first schema, wherein the modified element of the second schema comprises an element name, wherein the corresponding element of the first schema comprises the same element name, and wherein at least a portion of the modified element is different than a corresponding portion of the corresponding element; and
wherein automatically merging, with the software utility, the first schema and the second schema comprises automatically adding the modified element to the resulting merged schema and generating the resulting merged schema with the software utility to include an indicator that the modified element is available for the second version of the device, that the at least portion corresponds to the second version of the device, that the modified element is available for the first version of the device, and that the corresponding portion corresponds to the first version of the device.

10. The method of claim 1,
wherein automatically identifying differences between the first schema and the second schema comprises processing the first schema and the second schema with a software utility that automatically identifies a modified element of the second schema, wherein the modified element of the second schema corresponds to a corresponding element of the first schema, wherein the modified element of the second schema comprises an element name, wherein the corresponding element of the first schema comprises the same element name, and wherein at least a portion of the modified element is different than a corresponding portion of the corresponding element;
wherein automatically merging, with the software utility, the first schema and the second schema comprises automatically adding the modified element to the resulting merged schema and generating the resulting merged schema with the software utility to include an indicator that the modified element is available for the second version of the device, that the at least portion corresponds to the second version of the device, that the modified element is available for the first version of the device, and that the corresponding portion corresponds to the first version of the device;
wherein generating the resulting merged schema with the software utility to include an indicator comprises generating a first <match> tag that indicates that the element is available for the first version of the device using a first <release> tag and including with the first <match> tag an indication of the corresponding portion that corresponds to the first version of the device, and generating a second <match> tag that indicates that the element is available for the second version of the device using a second <release> tag and including with the second <match> tag an indication of the at least portion that corresponds to the second version of the device; and
wherein the modified element comprises a global element in the second schema, wherein the corresponding element comprises a local element in the first schema, and wherein indicating the at least portion for the second version comprises expressing the difference between the global element and the local element as a local element in the resulting merged schema that corresponds to the corresponding element of the first schema, wherein the expressed difference associates the at least portion of the modified element with the second version of the device and the corresponding portion of the corresponding element of the first schema with the first version of the device.

11. The method of claim 1,
wherein automatically identifying differences between the first schema and the second schema comprises processing the first schema and the second schema with a software utility that automatically identifies a modified element of the second schema, wherein the modified element of the second schema corresponds to a corresponding element of the first schema, wherein the modified element of the second schema comprises an element name, wherein the corresponding element of the first schema comprises the same element name, and wherein at least a portion of the modified element is different than a corresponding portion of the corresponding element;
wherein automatically merging, with the software utility, the first schema and the second schema comprises automatically adding the modified element to the resulting merged schema and generating the resulting merged schema with the software utility to include an indicator that the modified element is available for the second version of the device, that the at least portion corresponds to the second version of the device, that the modified element is available for the first version of the device, and that the corresponding portion corresponds to the first version of the device;
wherein generating the resulting merged schema with the software utility to include an indicator comprises generating a first <match> tag that indicates that the element is available for the first version of the device using a first <release> tag and including with the first <match> tag an indication of the corresponding portion that corresponds to the first version of the device, and generating a second <match> tag that indicates that the element is available for the second version of the device using a second <release> tag and including with the second <match> tag an indication of the at least portion that corresponds to the second version of the device; and
wherein the modified element comprises a local element in the second schema, wherein the corresponding element comprises a global element in the first schema, and wherein indicating the at least portion for the second version comprises expressing the difference between the local element and the global element as a modified local element in the resulting merged schema that corresponds to the corresponding element of the first schema, wherein the modified local element comprises a different name than the element name of the second schema, wherein the expressed difference associates the at least portion of the modified element with the second version of the device and the corresponding portion of the corresponding element of the first schema with the first version of the device, and including the global element in the resulting merged schema.

12. The method of claim 1, wherein the resulting merged schema is generated to cause the configuration data generated according to the resulting merged schema to conform to interfaces provided by the first and second devices, wherein the resulting merged schema comprises an extensible markup language (XML) schema definition (XSD) document that defines XML elements and attributes that can be present within XML configuration data for the XML configuration data to be considered valid for a given one of the devices in view of specifications and features of the device.

13. A computing device comprising:
a first interface to receive a first schema to be used for controlling generation of configuration data for a first version of a device in a device family;
a second interface to receive a second, different schema to be used for controlling generation of configuration data for a second, different version of the device in the device family;
a non-transitory computer-readable storage medium encoded with instructions for a schema merger module; and
a processor to execute the schema merger module to automatically identify differences between the first schema and the second schema and to automatically merge the first schema and the second schema to produce a resulting merged schema to be used for controlling generation of configuration data for both the first version of the device and the second version of the device according to the identified differences between the first schema and the second schema,
wherein the resulting merged schema expresses the identified differences between the first schema and the second schema and includes a single instance of each common portion between the first schema and the second schema.

14. The device of claim 13, wherein the first interface and the second interface comprise the same interface.

15. The device of claim 13, wherein the schema merger module comprises a comparator module to compare the first schema and the second schema and to identify an added element of the second schema, wherein the added element is present in the second schema but not in the first schema, and wherein the schema merger module comprises an element addition module to automatically add the added element to the resulting merged schema and to automatically indicate that the added element is available for the second version of the device.

16. The device of claim 13, wherein the schema merger module comprises a comparator module to compare the first schema and the second schema and to identify a removed element of the second schema, wherein the removed element is present in the first schema but not in the second schema, and wherein the schema merger module comprises an element removal module to automatically add the removed element to the resulting merged schema and to indicate that the removed element is available for the first version of the device and not available for the second version of the device.

17. The device of claim 13, wherein the schema merger module comprises a comparator module to compare the first schema and the second schema and to identify a modified element of the second schema, wherein the modified element of the second schema corresponds to a corresponding element of the first schema, wherein the modified element of the second schema comprises an element name, wherein the corresponding element of the first schema comprises the same element name, wherein at least a portion of the modified element is different than a corresponding portion of the corresponding element, and wherein the schema merger module comprises an element modifier module to add the modified element to the resulting merged schema and to indicate that the modified element is available for the second version of the device, that the at least portion corresponds to the second version of the device, that the modified element is also available for the first version of the device, and that the corresponding portion corresponds to the first version of the device, wherein the schema merger module is configured to generate a first <match> tag that indicates that the element is available for the first version of the device using a first <release> tag and include with the first <match> tag an indication of the corresponding portion that corresponds to the first version of the device, and to generate a second <match> tag that indicates that the element is available for the second version of the device using a second <release> tag and including with the second <match> tag an indication of the at least portion that corresponds to the second version of the device.

18. A non-transitory computer-readable storage medium encoded with instructions for causing a programmable processor to:
   receive a first schema to be used for controlling generation of configuration data for a first version of a device in a device family;
   receive a second, different schema to be used for controlling generation of configuration data for a second, different version of the device in the device family;
   automatically identify differences between the first schema and the second schema; and
   automatically merge the first schema and the second schema to produce a resulting merged schema to be used for controlling generation of configuration data for both the first version of the device and the second version of the device according to the identified differences between the first schema and the second schema, wherein the resulting merged schema expresses differences between the first schema and the second schema and includes a single instance of each common portion between the first schema and the second schema.

19. A system comprising:
a network-accessible repository comprising a first schema to be used for controlling generation of configuration data for a first version of a device in a device family;
a computing device comprising:
   a first interface to retrieve the first schema from the network-accessible repository;
   a second interface to receive a second, different schema to be used for controlling generation of configuration data for a second, different version of the device in the device family;
   a non-transitory computer-readable storage medium encoded with instructions for a schema merger module; and
   a processor to execute the schema merger module to automatically identify differences between the first schema and the second schema and to automatically merge the first schema and the second schema to produce a resulting merged schema to be used for controlling generation of configuration data for both the first version of the device and the second version of the device according to the identified differences between the first schema and the second schema, wherein the resulting merged schema expresses the identified differences between the first schema and the second schema and includes a single instance of each common portion between the first schema and the second schema, wherein the computing device is configured to publish the resulting merged schema to the network-accessible repository;
a first managed device comprising an instance of the first version of the device in the device family;
a second managed device comprising an instance of the second version of the device in the device family; and
a network management device communicatively coupled to the first managed device and the second managed device, wherein the network management device is configured to retrieve the published resulting merged schema from the network-accessible repository, to generate configuration data according to the resulting merged schema, and to manage the first managed device and the second managed device according to the generated configuration data.

* * * * *